(12) United States Patent
Wu et al.

(10) Patent No.: US 11,528,926 B2
(45) Date of Patent: Dec. 20, 2022

(54) DEFROSTING APPARATUS WITH REPOSITIONABLE ELECTRODE

(71) Applicant: NXP USA, Inc., Austin, TX (US)

(72) Inventors: Dong Wu, Carlsbad, CA (US); Qi Hua, Wu Xi (CN); Tonghe Liu, Pudong new district (CN); Yang Deng, Shanghai (CN)

(73) Assignee: NXP USA, Inc., Austin, TX (US)

( * ) Notice: Subject to any disclaimer, the term of this patent is extended or adjusted under 35 U.S.C. 154(b) by 535 days.

(21) Appl. No.: 16/594,215

(22) Filed: Oct. 7, 2019

(65) Prior Publication Data

US 2020/0120959 A1 Apr. 23, 2020

(30) Foreign Application Priority Data

Oct. 19, 2018 (CN) .......................... 201811218125.6

(51) Int. Cl.
*H05B 6/62* (2006.01)
*H05B 6/64* (2006.01)
(Continued)

(52) U.S. Cl.
CPC ................ *A23L 3/365* (2013.01); *H05B 6/54* (2013.01); *H05B 6/62* (2013.01); *H05B 6/6408* (2013.01)

(58) Field of Classification Search
CPC .. A23L 3/365; H05B 6/54; H05B 6/62; H05B 6/6408; H05B 1/00; H05B 3/00;
(Continued)

(56) References Cited

U.S. PATENT DOCUMENTS

| 2,633,400 A | 3/1953 | Ring |
| 3,271,169 A | 9/1966 | Baker et al. |

(Continued)

FOREIGN PATENT DOCUMENTS

| CN | 1880897 A | 12/2006 |
| CN | 1967113 A | 5/2007 |

(Continued)

OTHER PUBLICATIONS

Notice of Allowance; U.S. Appl. No. 16/221,315; 9 pages (dated Apr. 9, 2021).

(Continued)

*Primary Examiner* — Quang T Van

(57) ABSTRACT

A thermal increase system may be coupled to a containment structure for containing a load. The system includes a plurality of shelf support structures disposed within a cavity. The plurality of shelf support structures is configured to support a repositionable electrode at a plurality of positions within the cavity. The system includes a first electrode disposed at a first surface of the containment structure, wherein the repositionable electrode is disposed within the containment structure so as to divide the cavity into separate volumes. The system includes a radio frequency signal source electrically connected to one or both of the first electrode and the repositionable electrode. The radio frequency signal source is configured to provide radio frequency energy to either or both of the first electrode and the repositionable electrode.

19 Claims, 10 Drawing Sheets

(51) Int. Cl.
*A23L 3/365* (2006.01)
*H05B 6/54* (2006.01)

(58) Field of Classification Search
CPC . H05B 6/00; H05B 7/00; H05B 11/00; H05B 31/00; H05B 33/00; H05B 35/00; H05B 39/00; H05B 41/00; H05B 44/00; H05B 45/00; H05B 46/00; H05B 47/00; H05B 2203/00; H05B 2206/00; H05B 2213/00; H05B 2214/00
USPC ........ 219/771, 679, 680, 770, 773, 774, 780
See application file for complete search history.

(56) References Cited

U.S. PATENT DOCUMENTS

| | | | |
|---|---|---|---|
| 3,302,632 A | 2/1967 | Fichtner | |
| 3,797,870 A | 3/1974 | Beckman | |
| 4,296,299 A | 10/1981 | Stottmann et al. | |
| 4,303,820 A | 12/1981 | Stottmann et al. | |
| 4,333,521 A * | 6/1982 | Stottman | H05B 6/62 219/679 |
| 4,812,609 A | 3/1989 | Butot | |
| 4,978,826 A | 12/1990 | DeRuiter et al. | |
| 4,980,530 A | 12/1990 | Butot | |
| 5,266,766 A | 11/1993 | Hecox | |
| 5,541,392 A | 7/1996 | Miklos | |
| 5,556,567 A | 9/1996 | Landwehr et al. | |
| 6,278,093 B1 | 8/2001 | Lacovacci et al. | |
| 6,486,455 B1 | 11/2002 | Merabet | |
| 6,784,405 B2 | 8/2004 | Flugstad et al. | |
| 8,207,479 B2 | 6/2012 | Ben-Shmuel et al. | |
| 8,637,797 B2 | 1/2014 | Imura | |
| 9,215,756 B2 | 12/2015 | Bilchinsky et al. | |
| 9,265,097 B2 | 2/2016 | Torres et al. | |
| 9,318,818 B2 | 4/2016 | Nakamura et al. | |
| 11,089,661 B2 * | 8/2021 | Lester | H05B 6/54 |
| 11,382,190 B2 | 7/2022 | Piel et al. | |
| 2003/0068414 A1 | 4/2003 | Ito | |
| 2006/0008594 A1 | 1/2006 | Kang et al. | |
| 2006/0081624 A1 | 4/2006 | Takada et al. | |
| 2011/0016887 A1 | 1/2011 | Lee et al. | |
| 2012/0122072 A1 | 5/2012 | Bilchinsky et al. | |
| 2015/0295552 A1 | 10/2015 | Abou-Chahine et al. | |
| 2015/0351164 A1 | 12/2015 | Wesson et al. | |
| 2017/0181455 A1 | 6/2017 | Bullo et al. | |
| 2017/0203363 A1 * | 7/2017 | Rowland | B22F 12/22 |
| 2018/0042074 A1 | 2/2018 | Qiu et al. | |
| 2019/0104575 A1 | 4/2019 | Lester et al. | |

FOREIGN PATENT DOCUMENTS

| | | |
|---|---|---|
| CN | 105433192 A | 3/2016 |
| CN | 108521691 A | 9/2018 |
| CN | 108812854 A | 11/2018 |
| GB | 621 320 A | 4/1949 |
| GB | 844154 A | 8/1960 |
| JP | S53104463 A | 9/1978 |
| JP | S53153558 U | 12/1978 |
| JP | S5579970 A | 6/1980 |
| JP | S57102169 A | 6/1982 |
| JP | S62000784 A | 1/1987 |
| JP | H0541971 A | 2/1993 |
| JP | H10304860 A | 11/1998 |
| JP | H1132746 A | 2/1999 |
| JP | 2003-024025 A | 1/2003 |
| JP | 2003038148 A | 2/2003 |
| JP | 2004-247128 A | 9/2004 |
| JP | 4311997 B2 | 8/2009 |
| JP | 2010230307 A | 10/2010 |
| JP | 2012 207900 A | 10/2012 |
| JP | 2012207900 A | 10/2012 |
| JP | 2013111107 A | 6/2013 |
| TW | M478803 U | 5/2014 |

OTHER PUBLICATIONS

Notice of Allowance; U.S. Appl. No. 15/721,256; 10 pages (dated Sep. 3, 2021).
Final Office Action; U.S. Appl. No. 15/721,256; 31 pages (dated Oct. 14, 2020).
U.S. Appl. No. 16/221,315; not yet published; 49 pages (filed Dec. 14, 2018).
Non Final Office Action; U.S. Appl. No. 15/721,256; 25 pages (dated Apr. 2, 2020).

* cited by examiner

_US 11,528,926 B2_

DEFROSTING APPARATUS WITH REPOSITIONABLE ELECTRODE

CROSS-REFERENCE TO RELATED APPLICATION

This application claims the priority under 35 U.S.C. § 119 of Chinese patent application no. 201811218125.6, filed on Oct. 19, 2018, the contents of which are incorporated by reference herein.

TECHNICAL FIELD

Embodiments of the subject matter described herein relate generally to apparatus and methods of defrosting a load using radio frequency (RF) energy.

BACKGROUND

Conventional capacitive food defrosting (or thawing) systems include large planar electrodes contained within a heating compartment. After a food load is placed between the electrodes and the electrodes are brought into contact with the food load, low power electromagnetic energy is supplied to the electrodes to provide gentle warming of the food load. As the food load thaws during the defrosting operation, the impedance of the food load changes. Accordingly, the power transfer to the food load also changes during the defrosting operation. The duration of the defrosting operation may be determined, for example, based on the weight of the food load, and a timer may be used to control cessation of the operation.

Although good defrosting results are possible using such systems, variations in the size of the food load may result in inefficient defrosting of the food load. What are needed are apparatus and methods for defrosting food loads (or other types of loads) that may result in efficient and even defrosting throughout the load.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
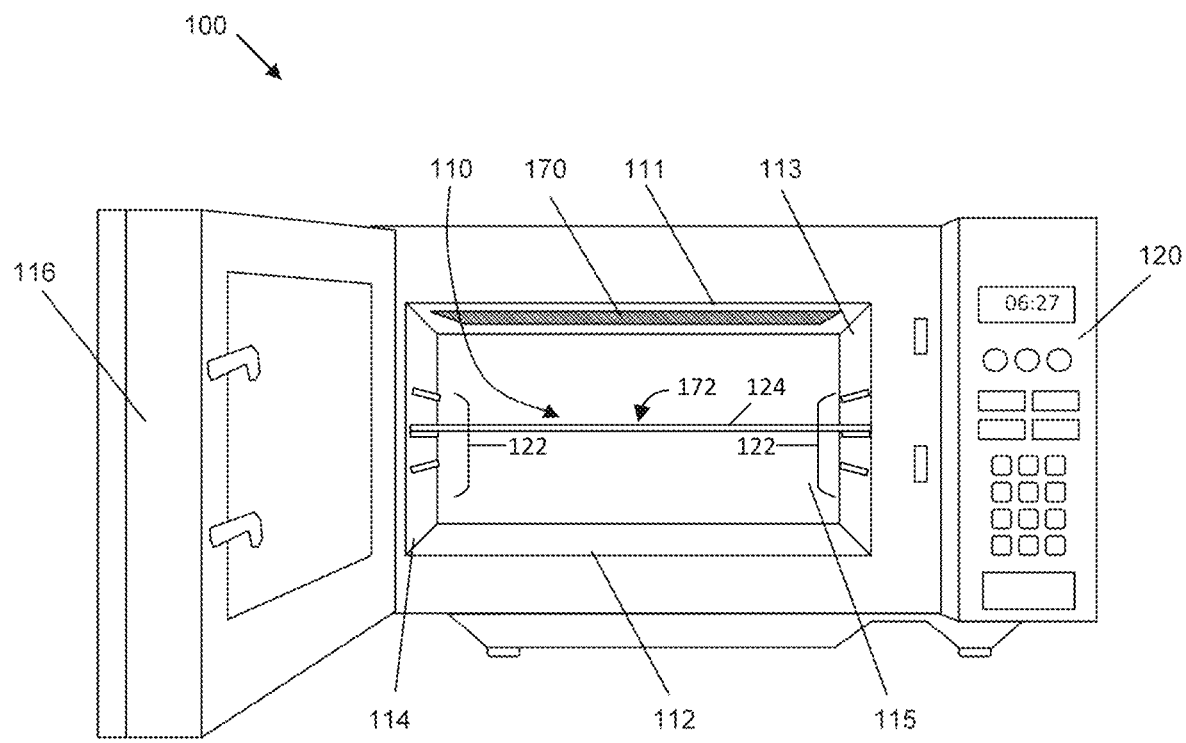
FIG. 1 is a perspective view of a defrosting appliance, in accordance with an example embodiment.

The following detailed description is merely illustrative in nature and is not intended to limit the embodiments of the subject matter or the application and uses of such embodiments. As used herein, the words "exemplary" and "example" mean "serving as an example, instance, or illustration." Any implementation described herein as exemplary or an example is not necessarily to be construed as preferred or advantageous over other implementations. Furthermore, there is no intention to be bound by any expressed or implied theory presented in the preceding technical field, background, or the following detailed description.

Embodiments of the subject matter described herein relate to solid-state defrosting apparatus that may be incorporated into stand-alone appliances or into other systems. As described in greater detail below, embodiments of solid-state defrosting apparatus include both "unbalanced" defrosting apparatus/systems and "balanced" defrosting apparatus/systems. Here, unbalanced defrosting apparatus/systems generally include a first electrode that receives an RF signal from an RF signal generator, and a second electrode that is connected to a static voltage, such as a ground or common voltage, while balanced defrosting apparatus/systems generally include a first electrode that receives a first RF signal from an RF signal generator and a second electrode that receives a second RF signal from the RF signal generator, where the first and second RF signals may be out of phase with one another.

Generally, the term "defrosting" means to elevate the temperature of a frozen load (e.g., a food load or other type of load) to a temperature at which the load is no longer frozen (e.g., a temperature at or near 0 degrees Celsius). As used herein, the term "defrosting" more broadly means a process by which the thermal energy or temperature of a load (e.g., a food load or other type of load) is increased through provision of RF power to the load. Accordingly, in various embodiments, a "defrosting operation" may be performed on a load with any initial temperature (e.g., any initial temperature above or below 0 degrees Celsius), and the defrosting operation may be ceased at any final temperature that is higher than the initial temperature (e.g., including final temperatures that are above or below 0 degrees Celsius). That said, the "defrosting operations" and "defrosting systems" described herein alternatively may be referred to as "thermal increase operations" and "thermal increase systems", or as "heating operations" and "heating systems." The term "defrosting" should not be construed to limit application of the invention to methods or systems that are only capable of raising the temperature of a frozen load to a temperature at or near 0 degrees Celsius.

Conventional heating systems (e.g., microwaves, toaster ovens, etc.) may be modified to integrate an RF defrosting system to enable a fast defrosting function for frozen food items or other applicable loads. However, such conventional systems generally have a relatively large inner height (e.g., 20-30 centimeters (cm)), between the floor (i.e., bottom interior surface) and ceiling (i.e., top interior surface) of the heating cavity. If the electric field generated during RF defrosting operations were required to extend across such a distance, defrosting efficiency would generally be low or, in some cases, defrosting would not be possible. Thus, in order to concentrate the electric field, a conductive (e.g., metal or partially metal) plate may be inserted into the cavity (e.g., at a location between the bottom and top interior surfaces of the cavity). The presence of this conductive plate, referred to herein as a "repositionable electrode", may divide the cavity into upper and lower volumes, with the electric field produced by the application of RF energy to an electrode being concentrated in one of the upper and lower volumes. For example, for an embodiment in which an upper electrode is disposed in or at the ceiling of the cavity, when a repositionable electrode is inserted into the cavity and RF energy is applied to the upper electrode, the resultant electric field will be concentrated in the upper volume of the cavity, between the upper electrode and the repositionable electrode. In this way, the defrosting of a load placed over the repositionable electrode (in the upper volume) will be more efficient than the defrosting of a load placed on the floor of the cavity without the repositionable electrode present. It should be noted that in the various embodiments described herein, the electrode inserted into the cavity may be electrically floating, may be electrically grounded, or may be coupled to an RF signal source to act as the second electrode of a "balanced" defrosting system. Additionally, by providing multiple sets of support structures (e.g., rails) at different heights upon which the repositionable electrode may be placed, the defrosting system may be adapted to accommodate loads of different sizes, allowing for increased flexibility.

FIG. 1 is a perspective view of a defrosting system 100, in accordance with an example embodiment. Defrosting system 100 includes a defrosting cavity 110 (e.g., cavity 360, 460, 560, FIGS. 3-5), a control panel 120, one or more radio frequency (RF) signal sources (e.g., RF signal source 320, 420, FIGS. 3, 4), a power supply (e.g., power supply 326, 426, FIGS. 3, 4), a first electrode 170 (e.g., electrode 340, 440, 540 FIGS. 3, 4, 5), a second electrode 172 (e.g., electrode 372, 472, 504, FIGS. 3, 4, 5), a system controller (e.g., system controller 312, 412, FIGS. 3, 4), support structures 122, and a repositionable shelf 124, which may include a second electrode 172 that is electrically grounded, electrically floating, or that receives an RF signal (e.g., from the RF signal sources 320, 420, FIGS. 3, 4). In some embodiments, the second electrode 172 may be electrically conductive (e.g., metal) material embedded in the repositionable shelf 124, while in other embodiments, the repositionable shelf 124 may be entirely electrically conductive such that the entire repositionable shelf 124 makes up the second electrode 172 The defrosting cavity 110 is defined by interior surfaces of top, bottom, side, and back cavity walls 111, 112, 113, 114, 115 and an interior surface of door 116. With door 116 closed, the defrosting cavity 110 defines an enclosed air cavity. As used herein, the term "air cavity" may mean an enclosed area or volume that contains air or other gasses (e.g., defrosting cavity 110). The repositionable shelf 124 may be supported by an opposing pair of the support structures 122. The support structures 122 may be rails attached to the walls 173 and 174 or may be recessed portions of the walls 173 and 174, for example.

According to an "unbalanced" embodiment, the first electrode 170 is arranged proximate to a cavity wall (e.g., top wall 111), the first electrode 170 is electrically isolated from the remaining cavity walls (e.g., walls 112-115 and door 116), and the remaining cavity walls are grounded. The electrode 172 may be electrically grounded via electrical connection (e.g., through the support structures 122) to the grounded cavity walls (e.g., walls 112-115). In such a configuration, the system may be simplistically modeled as a capacitor, where the first electrode 170 functions as one conductive plate (or electrode), the grounded cavity walls and the electrode 172 of the repositionable shelf 124 function as a second conductive plate (or electrode), and the air cavity (including any load contained therein) functions as a dielectric medium between the first and second conductive plates. Although not shown in FIG. 1, a non-electrically conductive barrier (e.g., barrier 362, 462, FIGS. 3, 4) also may be included in the system 100, and the non-conductive barrier may function to electrically and physically isolate the load from the electrode 172 of the repositionable shelf 124.

According to a "balanced" embodiment, the first electrode 170 is arranged proximate to a first cavity wall (e.g., top wall 111), the second electrode 172 of the repositionable shelf 124 disposed at a height within the cavity corresponding to that of a pair of the support structures 122 that support the repositionable shelf 124. The first and second electrodes 170, 172 are electrically isolated from the remaining cavity walls (e.g., walls 112-115 and door 116). The first electrode 170 and the second electrode 172 may receive respective first and second balanced RF signals from an RF signal source (e.g., RF signal sources 320, 420, FIGS. 3, 4) In such a configuration, the system also may be simplistically modeled as a capacitor, where the first electrode 170 functions as one conductive plate (or electrode), the second electrode 172 functions as a second conductive plate (or electrode), and the air cavity (including any load contained therein) function as a dielectric medium between the first and second conductive plates. Although not shown in FIG. 1, a non-electrically conductive barrier (e.g., barrier 462, FIG. 4) also may be included in the system 100, and the non-conductive barrier may function to electrically and physically isolate the load from the second electrode 172.

According to an embodiment, during operation of the defrosting system 100, a user (not illustrated) may place the repositionable shelf 124 at a selected location within the defrosting cavity 110, such that the repositionable shelf 124 is supported by a pair of the support structures 122. For example, when a user intends to heat a small load, a pair of the support structures 122 close to the electrode 170 may be selected to support the repositionable shelf 124. For a comparatively larger load, a pair of the support structures 122 further away from the electrode 170 may be selected to support the repositionable shelf 124 so that enough space is provided between the repositionable shelf 124 and the electrode 170 to accommodate the larger load. Generally, the user may select a pair of the support structures 122 that provides the minimum distance between the repositionable shelf 124 and the electrode 170 while still providing enough space to accommodate a load that the user intends to place on the repositionable shelf 124. Once the repositionable shelf 124 is placed, the user may place one or more loads (e.g., food and/or liquids) into the defrosting cavity 110 (e.g., between the repositionable shelf 124 and the electrode 170), and optionally may provide inputs via the control panel 120 that specify characteristics of the load(s). For example, the specified characteristics may include an approximate weight of the load. In addition, the specified load characteristics may indicate the material(s) from which the load is formed (e.g., meat, bread, liquid). In alternate embodiments, the load characteristics may be obtained in some other way, such as by scanning a barcode on the load packaging or receiving a radio frequency identification (RFID) signal from an RFID tag on or embedded within the load. Either way, as will be described in more detail later, information regarding such load characteristics can enable the system controller to control the RF heating process.

To begin the defrosting operation, the user may provide an input via the control panel 120. In response, the system controller causes the RF signal source(s) (e.g., RF signal source 320, 420, FIGS. 3, 4) to supply an RF signal to the first electrode 170 in an unbalanced embodiment, or to both the first and second electrodes 170, 172 in a balanced embodiment, and the electrode(s) responsively radiate electromagnetic energy into the defrosting cavity 110. The electromagnetic energy increases the thermal energy of the load (i.e., the electromagnetic energy causes the load to warm up).

During the defrosting operation, the impedance of the load (and thus the total input impedance of the cavity 110 plus load) changes as the thermal energy of the load increases. The impedance changes alter the absorption of RF energy into the load, and thus alter the magnitude of reflected power. According to an embodiment, power detection circuitry continuously or periodically measures the reflected power along a transmission path (e.g., transmission path 328, 428/430, FIGS. 3, 4) between the RF signal source (e.g., RF signal source 320, 420, FIGS. 3, 4) and the electrode(s) 170, 172, and in some embodiments, also measures forward power. Based on these measurements, the system controller (e.g., system controller 312, 412, FIGS. 3, 4) may detect completion of the defrosting operation. According to a further embodiment, a variable impedance matching network is disposed along the transmission path for the RF signal, and based on the reflected power measurements (or both the forward and reflected power measurements), the system controller may alter the state of the impedance matching network during the defrosting operation to increase the absorption of RF power by the load.

Figure 2:
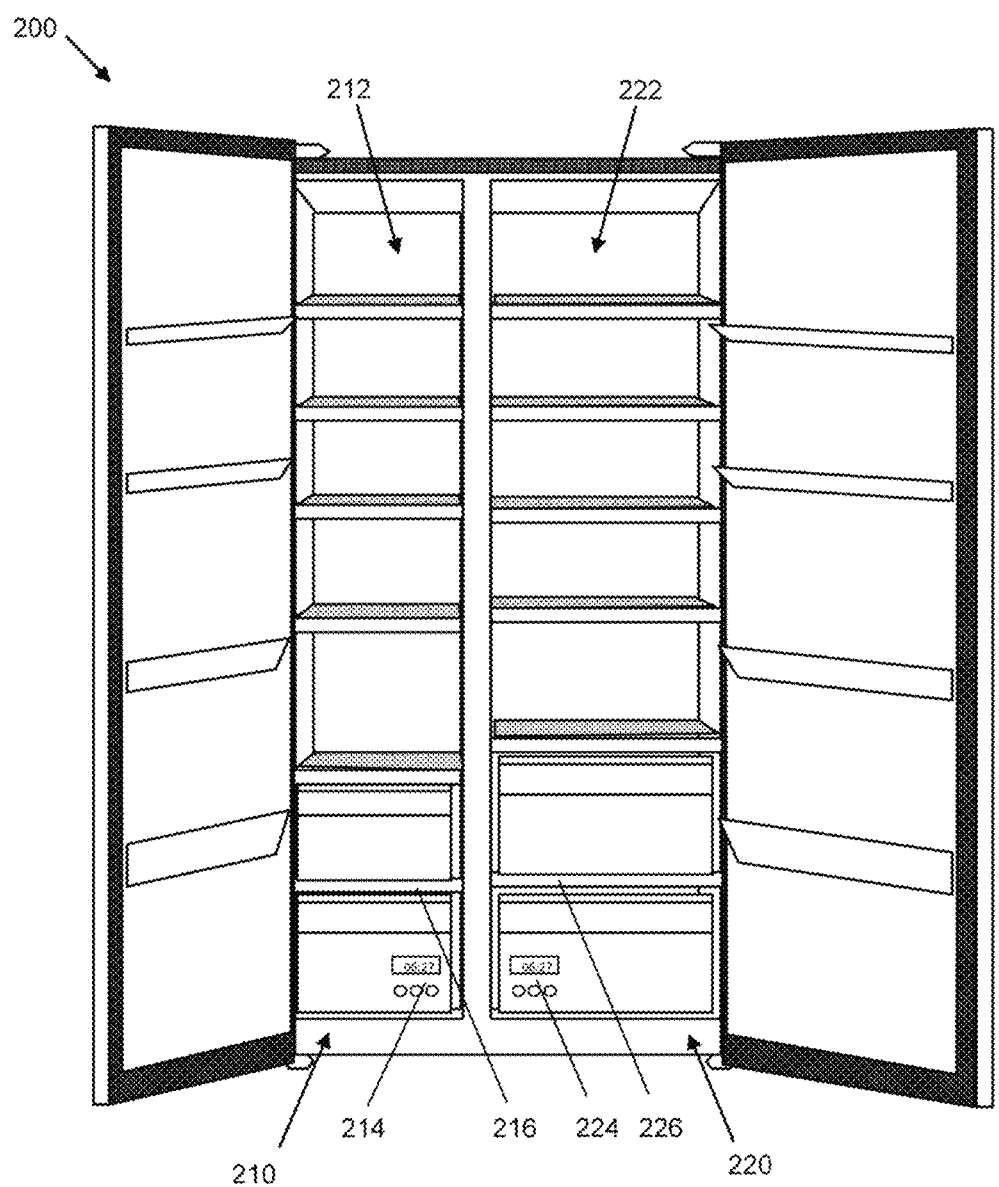
FIG. 2 is a perspective view of a refrigerator/freezer appliance that includes other example embodiments of defrosting systems.

The defrosting system 100 of FIG. 1 is embodied as a counter-top type of appliance. In a further embodiment, the defrosting system 100 also may include components and functionality for performing microwave cooking operations. Alternatively, components of a defrosting system may be incorporated into other types of systems or appliances. For example, FIG. 2 is a perspective view of a refrigerator/freezer appliance 200 that includes other example embodiments of defrosting systems 210, 220. More specifically, defrosting system 210 is shown to be incorporated within a freezer compartment 212 of the system 200, and defrosting system 220 is shown to be incorporated within a refrigerator compartment 222 of the system. An actual refrigerator/freezer appliance likely would include only one of the defrosting systems 210, 220, but both are shown in FIG. 2 to concisely convey both embodiments.

Figure 3:
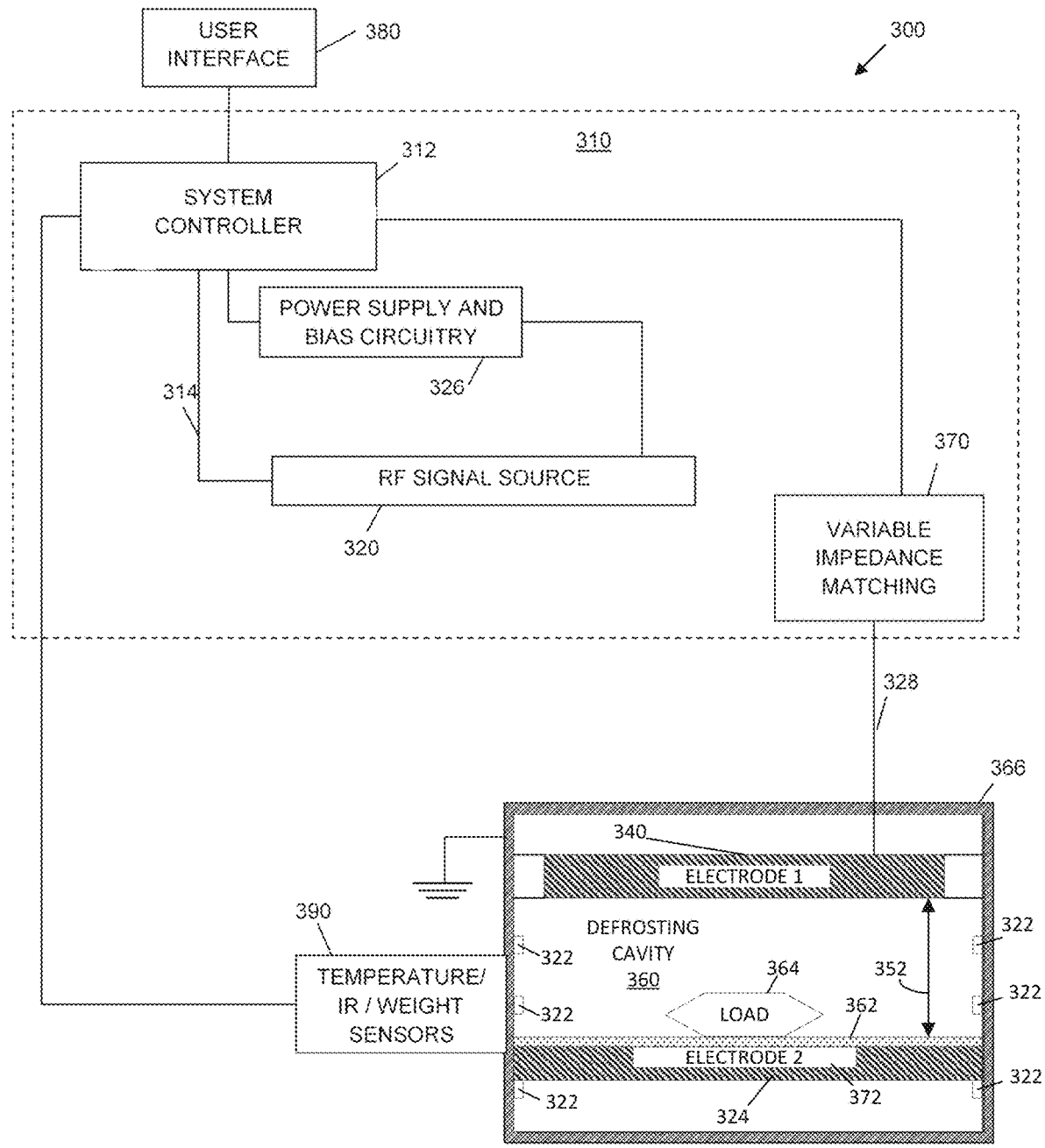
FIG. 3 is a simplified block diagram of an unbalanced defrosting apparatus, in accordance with an example embodiment.
Figure 4:
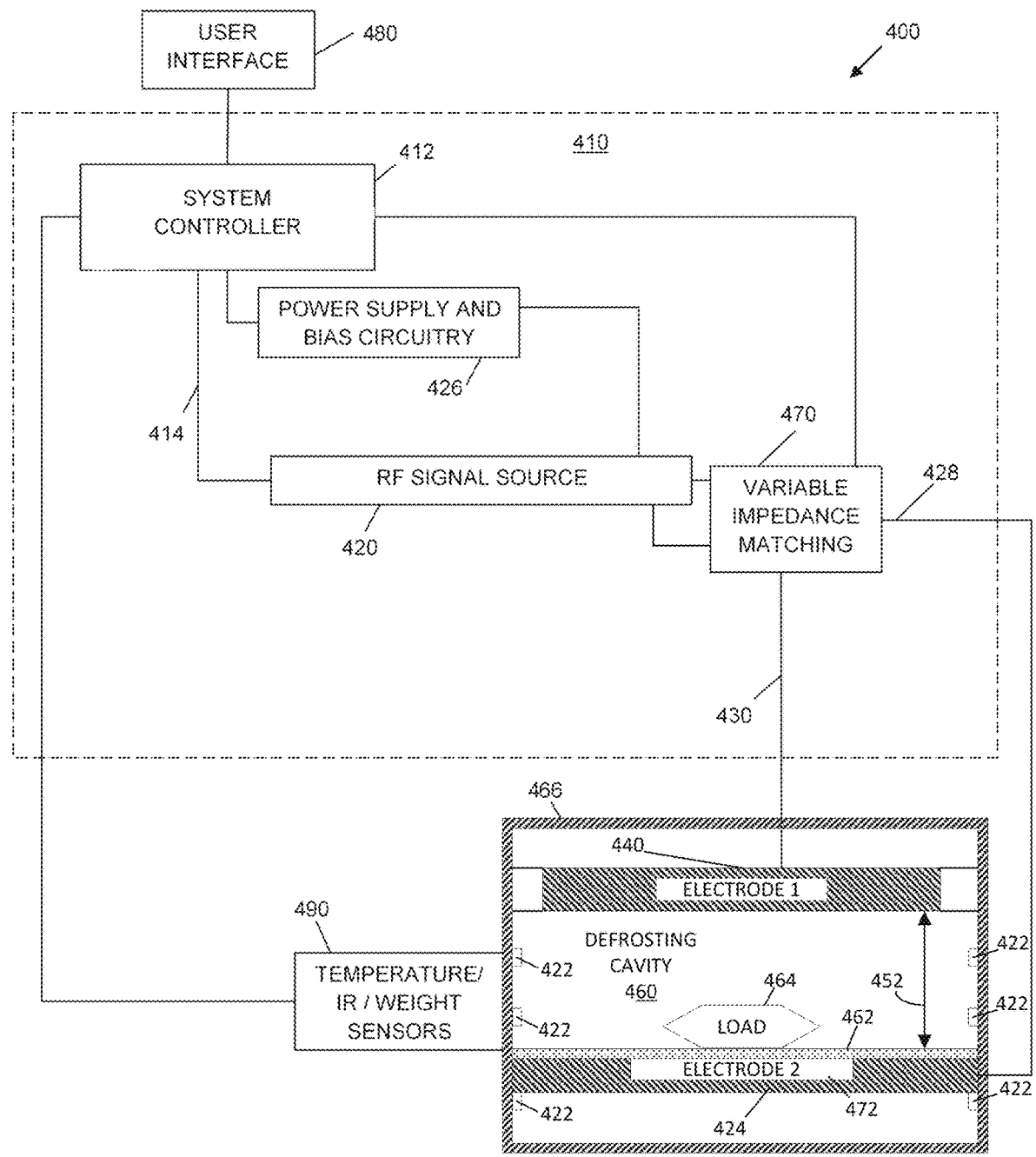
FIG. 4 is a simplified block diagram of a balanced defrosting apparatus, in accordance with another example embodiment.

Similar to the defrosting system 100, each of defrosting systems 210, 220 includes a defrosting cavity, a control panel 214, 224, one or more RF signal sources (e.g., RF signal source 320, 420, FIGS. 3, 4), a power supply (e.g., power supply 326, 426, FIGS. 3, 4), a first electrode (e.g., electrode 170, 340, 440, FIGS. 1, 3, 4), multiple support structures (e.g., support structures 122, FIG. 1) disposed at opposing interior walls of the defrosting cavity, a repositionable shelf (e.g., repositionable shelf 124, FIG. 1) supported by a pair of the support structures, a second electrode in the repositionable shelf (e.g., electrode 172, 372 472, FIGS. 1, 3, 4), and a system controller (e.g., system controller 312, 412, FIGS. 3, 4). For example, the defrosting cavity may be defined by interior surfaces of bottom, side, front, and back walls of a containment structure, with the support structures being disposed at the side walls of the containment structure. The front wall of the containment structure may be a door or other structure capable of being opened and closed, which when closed creates enclosed air cavity. The components and functionalities of the defrosting systems 210, 220 may be substantially the same as the components and functionalities of defrosting system 100, in various embodiments.

In addition, according to an embodiment, each of the defrosting systems 210, 220 may have sufficient thermal communication with the freezer or refrigerator compartment 212, 222, respectively, in which the system 210, 220 is disposed. In such an embodiment, after completion of a defrosting operation, the load may be maintained at a safe temperature (i.e., a temperature at which food spoilage is prevented) until the load is removed from the system 210, 220. More specifically, upon completion of a defrosting operation by the freezer-based defrosting system 210, the cavity within which the defrosted load is contained may thermally communicate with the freezer compartment 212, and if the load is not promptly removed from the cavity, the load may re-freeze. Similarly, upon completion of a defrosting operation by the refrigerator-based defrosting system 220, the cavity within which the defrosted load is contained may thermally communicate with the refrigerator compartment 222, and if the load is not promptly removed from the cavity, the load may be maintained in a defrosted state at the temperature within the refrigerator compartment 222.

Those of skill in the art would understand, based on the description herein, that embodiments of defrosting systems may be incorporated into systems or appliances having other configurations, as well. Accordingly, the above-described implementations of defrosting systems in a stand-alone appliance, a microwave oven appliance, a freezer, and a refrigerator are not meant to limit use of the embodiments only to those types of systems.

Although defrosting systems 100, 200 are shown with their components in particular relative orientations with respect to one another, it should be understood that the various components may be oriented differently, as well. In addition, the physical configurations of the various components may be different. For example, control panels 120, 214, 224 may have more, fewer, or different user interface elements, and/or the user interface elements may be differently arranged. In addition, although a substantially cubic defrosting cavity 110 is illustrated in FIG. 1, it should be understood that a defrosting cavity may have a different shape, in other embodiments (e.g., cylindrical, and so on). Further, defrosting systems 100, 210, 220 may include additional components (e.g., a fan, a stationary or rotating plate, a tray, an electrical cord, and so on) that are not specifically depicted in FIGS. 1, 2.

FIG. 3 is a simplified block diagram of an unbalanced defrosting system 300 (e.g., defrosting system 100, 210, 220, FIGS. 1, 2), in accordance with an example embodiment. Defrosting system 300 includes RF subsystem 310, defrosting cavity 360, user interface 380, system controller 312, RF signal source 320, power supply and bias circuitry 326, a first electrode 340, support structures 322 (e.g., support structures 122, FIG. 1), a repositionable shelf 324 (e.g., repositionable shelf 124, FIG. 1) that is supported by a pair of the support structures 322 and that includes a second electrode 372 (e.g., second electrode 172, FIG. 1) and a non-conductive barrier 362, and a containment structure 366, in an embodiment. In some embodiments, the second electrode 372 may be conductive material embedded in or disposed on the repositionable shelf 324 (e.g., in or on non-conductive material thereof). In other embodiments, the repositionable shelf 324 may be entirely conductive material such that all of the repositionable shelf 324 acts as the second electrode 372. In addition, in other embodiments, defrosting system 300 may include temperature sensor(s), infrared (IR) sensor(s), and/or weight sensor(s) 390, although some or all of these sensor components may be excluded. It should be understood that FIG. 3 is a simplified representation of a defrosting system 300 for purposes of explanation and ease of description, and that practical embodiments may include other devices and components to provide additional functions and features, and/or the defrosting system 300 may be part of a larger electrical system.

User interface 380 may correspond to a control panel (e.g., control panel 120, 214, 224, FIGS. 1, 2), for example, that enables a user to provide inputs to the defrosting system 300 regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

Some embodiments of defrosting system 300 may include temperature sensor(s), IR sensor(s), and/or weight sensor(s) 390. The temperature sensor(s) and/or IR sensor(s) may be positioned in locations that enable the temperature of a load 364 to be sensed during the defrosting operation. When provided to the system controller 312, the temperature information may enable the system controller 312 to alter the power of the RF signal supplied by the RF signal source 320 (e.g., by controlling the bias and/or supply voltages provided by the power supply and bias circuitry 326), and/or to determine when the defrosting operation should be terminated. The weight sensor(s) may be positioned under the load 364, and are configured to provide an estimate of the weight of the load 364 to the system controller 312. The system controller 312 may use this information, for example, to determine a desired power level for the RF signal supplied by the RF signal source 320, and/or to determine an approximate duration for the defrosting operation.

The RF subsystem 310 includes a system controller 312, an RF signal source 320, a variable impedance matching network 370, and power supply and bias circuitry 326, in an embodiment. System controller 312 may include one or more general purpose or special purpose processors (e.g., a microprocessor, microcontroller, Application Specific Integrated Circuit (ASIC), and so on), volatile and/or non-volatile memory (e.g., Random Access Memory (RAM), Read Only Memory (ROM), flash, various registers, and so on), one or more communication busses, and other components. According to an embodiment, system controller 312 is coupled to user interface 380, RF signal source 320, and sensors 390 (if included). System controller 312 can provide control signals to the power supply and bias circuitry 326 and to the RF signal source 320. In addition, the system controller 312 provides control signals to the variable impedance matching network 370, which cause the network 370 to change its state or configuration.

Defrosting cavity 360 includes a capacitive defrosting arrangement with first and second parallel plate electrodes that are separated by an air cavity within which a load 364 to be defrosted may be placed. For example, a first electrode 340 may be positioned above the air cavity, and a second electrode 372 may be positioned below the air cavity. More specifically, the containment structure 366 may include bottom, top, and side walls, that may include a portion of a door or hatch for containment structure 366, the interior surfaces of which define the cavity 360 (e.g., cavity 110, FIG. 1). The support structures 322 may be disposed at the side walls of the containment structure 366, and the repositionable shelf 324 that includes the second electrode 372 may be selectively placed (e.g., by a user) on opposing pairs of the support structures 322, which allows the size of the air cavity between the first and second electrodes 340 and 372 to be modified (e.g., for the accommodation of different sized loads). According to an embodiment, the cavity 360 may be sealed (e.g., with a door 116, FIG. 1) to contain the electromagnetic energy that is introduced into the cavity 360 during a defrosting operation. The system 300 may include one or more interlock mechanisms that ensure that the seal is intact during a defrosting operation. If one or more of the interlock mechanisms indicates that the seal is breached, the system controller 312 may cease the defrosting operation. According to an embodiment, the containment structure 366 is at least partially formed from conductive material, and the conductive portion(s) of the containment structure 366 may be grounded. In some embodiments, the second electrode 372 may be electrically floating, while in other embodiments, the second electrode 372 may be electrically connected to ground via a connection to the containment structure 366 through the support structures 322. To avoid direct contact between the load 364 and the surface of the electrode 372, a non-conductive barrier 362 may be positioned over the top surface of the second electrode 372.

Essentially, defrosting cavity 360 includes a capacitive defrosting arrangement with first and second parallel plate electrodes 340, 372 that are separated by an air cavity within which a load 364 to be defrosted may be placed. The second electrode 372 is positioned (e.g., via the positioning of the repositionable shelf 324) within containment structure 366 to define a distance 352 between the electrode 340 and an opposed surface of the second electrode 372.

In various embodiments, the distance 352 is in a range of about 0.10 meters to about 1.0 meter, although the distance may be smaller or larger, as well. The distance 352 may change as the repositionable shelf 324 is moved to be disposed at different pairs of the support structures 322 (e.g., by the user to accommodate loads of varying size). According to an embodiment, distance 352 may be less than one wavelength of the RF signal produced by the RF subsystem 310. In some embodiments, the distance 352 is less than about half of one wavelength of the RF signal. In other embodiments, the distance 352 is less than about one quarter of one wavelength of the RF signal. In still other embodiments, the distance 352 is less than about one eighth of one wavelength of the RF signal. In still other embodiments, the distance 352 is less than about one 50th of one wavelength of the RF signal. In still other embodiments, the distance 352 is less than about one 100th of one wavelength of the RF signal.

The first electrode 340 and the containment structure 366 are capacitively coupled. More specifically, the first electrode 340 may be analogized to a first plate of a capacitor, the containment structure 366 may be analogized to a second plate of a capacitor, and the load 364, barrier 362, and air within the cavity 360 may be analogized to a capacitor dielectric. Accordingly, the first electrode 340 alternatively may be referred to herein as an "anode," and the second electrode 372 may alternatively be referred to herein as a "cathode."

Essentially, the voltage across the first electrode 340 and the second electrode 372 heats the load 364 within the cavity 360. According to various embodiments, the RF subsystem 310 is configured to generate the RF signal to produce voltages between the first electrode 340 and the second electrode 372 in a range of about 90 volts to about 3,000 volts, in one embodiment, or in a range of about 3000 volts to about 10,000 volts, in another embodiment, although the system may be configured to produce lower or higher voltages between the first electrode 340 and the second electrode 372, as well.

The first electrode 340 is electrically coupled to the RF signal source 320 via the variable impedance matching network 370 and a conductive transmission path 328, which may include a plurality of conductors. According to an embodiment, the conductive transmission path 328 is an "unbalanced" path, which is configured to carry an unbalanced RF signal (i.e., a single RF signal referenced against ground). In some embodiments, one or more connectors (not shown, but each having male and female connector portions) may be electrically coupled along the transmission path 328, and the portion of the transmission path 328 between the connectors may comprise a coaxial cable or other suitable connector.

The variable impedance matching network 370 may include, in an embodiment, an arrangement of variable and (optionally) non-variable passive components, such as resistors, capacitors, and/or inductors. The variable impedance matching network 370 may be configured to perform an impedance transformation from an output impedance of the RF signal source 320 (e.g., about 10 ohms) to "match" an input impedance of the defrosting cavity 360, as modified by the load 364 (e.g., on the order of hundreds or thousands of ohms, such as about 1000 ohms to about 4000 ohms or more). As the temperature of the load 364 increases over the course of a defrosting operation, the impedance of the defrosting cavity 360 will change. The system controller 312 may therefore adjust the impedance of the variable impedance matching network 370 over the course of a defrosting operation to account for changes in the impedance of the defrosting cavity 360. In some embodiments, the system controller 312 may perform this adjustment of the variable impedance matching network 370 in response to detecting that S11 parameters of the system have exceeded a predefined threshold (e.g., using power detection circuitry disposed along the path 328, not shown).

In response to control signals provided by system controller 312 over connection 314, RF signal source 320 is configured to produce an oscillating electrical signal. The RF signal source 320 may be controlled to produce oscillating signals of different power levels and/or different frequencies, in various embodiments. For example, the RF signal source 320 may produce a signal that oscillates in a range of about 10.0 megahertz (MHz) to about 100 MHz and/or from about 100 MHz to about 3.0 gigahertz (GHz).

In the embodiment of FIG. 3, the RF signal source 320 may include multiple amplifier stages, such as a driver amplifier stage and a final amplifier stage, to generate an amplified output signal. For example, the output signal of the RF signal source 320 may have a power level in a range of about 100 watts to about 400 watts or more.

The gain applied by the power amplifier may be controlled using gate bias voltages and/or drain supply voltages provided by the power supply and bias circuitry 326 to the one or more amplifier stages. More specifically, power supply and bias circuitry 326 provides bias and supply voltages to each RF amplifier stage in accordance with control signals received from system controller 312.

In an embodiment, RF signal source 320 includes a laterally diffused metal oxide semiconductor FET (LDMOS-FET) transistor. However, it should be noted that the transistors are not intended to be limited to any particular semiconductor technology, and in other embodiments, each transistor may be realized as a gallium nitride (GaN) transistor, another type of MOSFET transistor, a bipolar junction transistor (BJT), or a transistor utilizing another semiconductor technology.

Defrosting cavity 360 and any load 364 (e.g., food, liquids, and so on) positioned in the defrosting cavity 360 present a cumulative load for the electromagnetic energy (or RF power) that is radiated into the cavity 360 by the first electrode 340. More specifically, the cavity 360 and the load 364 present an impedance to the system, referred to herein as a "cavity input impedance." The cavity input impedance changes during a defrosting operation as the temperature of the load 364 increases.

Electrical power is supplied to the RF signal source 320 by the power supply and bias circuitry 326. Power supply and bias circuitry 326 generally outputs a direct current (DC) voltage to the RF signal source 320, where the DC voltage may be in the range of 0 volts to 65 volts. The magnitude of the DC voltage outputted by power supply and bias circuitry 326 may be set or determined by system controller 312. For example, based upon inputs received from the user interface 380 and the sensors 390, system controller 312 may select an appropriate output voltage for power supply and bias circuitry 326. The output voltage may be greater, for example, for loads 364 having a greater weight than for loads that weigh less. Based upon those various inputs, the system controller 312 may utilize a look-up table to determine a suitable output voltage for power supply and bias circuitry 326. In some embodiments, the system controller 312 may cause the output voltage of power supply and bias circuitry 326 to vary throughout a defrosting process for a particular load 364.

To achieve the different output DC voltages of power supply and bias circuitry 326, the power supply and bias circuitry 326 may be configured to be a variable power supply capable of generating and outputting those different output voltages. But, in other embodiments, the power supply and bias circuitry 326 may be configured to generate a fixed output voltage. In that case, the defrosting system 300 may incorporate a pulse-width modulation circuit configured to modulate that fixed output voltage into variable output voltages (e.g., voltages ranging from 0 volts to 65 volts) that may be utilized to operate the RF signal source 320 and implement the functionality of the defrosting system 300.

FIG. 3 and the related discussion, describe an "unbalanced" defrosting apparatus, in which an RF signal is applied to a first electrode (e.g., electrode 340, FIG. 3), and a second, repositionable electrode (e.g., second electrode 372, FIG. 3) is grounded or electrically floating. As mentioned above, an alternate embodiment of a defrosting apparatus comprises a "balanced" defrosting apparatus. In such an apparatus, RF signals are provided to both electrodes.

For example, FIG. 4 is a simplified block diagram of a balanced defrosting system 400 (e.g., defrosting system 100, 210, 220, FIGS. 1, 2), in accordance with an example embodiment. Defrosting system 400 includes RF subsystem 410, defrosting cavity 460, user interface 480, system controller 412, RF signal source 420, power supply and bias circuitry 426, and two electrodes 440, 472, in an embodiment. In addition, in other embodiments, defrosting system 400 may include temperature sensor(s), infrared (IR) sensor(s), and/or weight sensor(s) 490, although some or all of these sensor components may be excluded. It should be understood that FIG. 4 is a simplified representation of defrosting system 400 for purposes of explanation and ease of description, and that practical embodiments may include other devices and components to provide additional functions and features, and/or the defrosting system 400 may be part of a larger electrical system.

User interface 480 may correspond to a control panel (e.g., control panel 120, 214, 224, FIGS. 1, 2), for example, which enables a user to provide inputs to the system regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

The RF subsystem 410 includes a system controller 412, an RF signal source 420, and power supply and bias circuitry 426, in an embodiment. System controller 412 may include one or more general purpose or special purpose processors (e.g., a microprocessor, microcontroller, ASIC, and so on), volatile and/or non-volatile memory (e.g., RAM, ROM, flash, various registers, and so on), one or more communication busses, and other components. According to an embodiment, system controller 412 is operatively and communicatively coupled to user interface 480, RF signal source 420, and power supply and bias circuitry 426. System controller 412 is configured to receive signals indicating user inputs received via user interface 480 and sensor(s) 490. Responsive to the received signals, system controller 412 provides control signals to the power supply and bias circuitry 426 and/or to the RF signal source 420. In addition, the system controller 412 provides control signals to the variable impedance matching network 470, which cause the network 470 to change its state or configuration.

Defrosting cavity 460 includes a capacitive defrosting arrangement with first and second parallel plate electrodes 440, 472 that are separated by an air cavity within which a load 464 to be defrosted may be placed. Within a containment structure 466, first and second electrodes 440, 472 (e.g., electrodes 170, 172, FIG. 1) may be positioned opposite to one another on either side of an interior defrosting cavity 460 (e.g., interior cavity 260, FIG. 2).

The first and second electrodes 440, 472 are separated across the cavity 460 by a distance 452, which may vary as the shelf 424 is repositioned to be disposed on different pairs of the support structures 422 (e.g., by the user to accommodate loads of varying size). In various embodiments, the distance 452 is in a range of about 0.10 meters to about 1.0 meter, although the distance may be smaller or larger, as well. According to an embodiment, distance 452 may be less than one wavelength of the RF signal produced by the RF subsystem 410. In some embodiments, the distance 452 is less than about half of one wavelength of the RF signal. In other embodiments, the distance 452 is less than about one quarter of one wavelength of the RF signal. In still other embodiments, the distance 452 is less than about one eighth of one wavelength of the RF signal. In still other embodiments, the distance 452 is less than about one 50th of one wavelength of the RF signal. In still other embodiments, the distance 452 is less than about one 100th of one wavelength of the RF signal.

The first and second electrodes 440, 472 are capacitively coupled. More specifically, the first electrode 440 may be analogized to a first plate of a capacitor, the second electrode 472 may be analogized to a second plate of a capacitor, and the load 464, barrier 462, and air within the cavity 460 may be analogized to a capacitor dielectric. Accordingly, the first electrode 440 alternatively may be referred to herein as an "anode," and the second electrode 472 may alternatively be referred to herein as a "cathode."

Essentially, the voltage across the first and second electrodes 440, 472 heats the load 464 within the cavity 460. According to various embodiments, the RF subsystem 410 is configured to generate the RF signal to produce voltages across the electrodes 440, 472 in a range of about 90 volts to about 3000 volts, in one embodiment, or in a range of about 3000 volts to about 10,000 volts, in another embodiment, although the system may be configured to produce lower or higher voltages across electrodes 440, 472, as well.

An output of the RF subsystem 410, and more particularly an output of the variable impedance matching network 470, is electrically coupled to each of electrodes 440, 472 via conductive paths 430, 428, respectively. For example, the RF subsystem 410 may output two balanced RF signals, one provided to electrode 440 along path 430 and the other provided to electrode 472 along path 428. These balanced RF signals may be, for example, produced as the outputs of a balun, a push-pull amplifier, or a balanced amplifier that has received an unbalanced RF signal from RF signal source 420.

The variable impedance matching network 470 may include, in an embodiment, an arrangement of variable and (optionally) non-variable passive components, such as resistors, capacitors, and/or inductors. The variable impedance matching network 470 may be configured to perform an impedance transformation from an output impedance of the RF signal source 420 (e.g., about 10 ohms) to "match" an input impedance of the defrosting cavity 460, as modified by the load 464 (e.g., on the order of hundreds or thousands of ohms, such as about 1000 ohms to about 4000 ohms or more). As the temperature of the load 464 increases over the course of a defrosting operation, the impedance of the defrosting cavity 460 will change. The system controller 412 may therefore adjust the impedance of the variable impedance matching network 470 over the course of a defrosting operation to account for changes in the impedance of the defrosting cavity 460. In some embodiments, the system controller 412 may perform this adjustment of the variable impedance matching network 470 in response to detecting that S11 parameters of the system have exceeded a predefined threshold (e.g., using power detection circuitry disposed along the path 428, not shown).

In response to control signals provided by system controller 412 over connection 414, RF signal source 420 is configured to produce an oscillating electrical signal. The RF signal source 420 may be controlled to produce oscillating signals of different power levels and/or different frequencies, in various embodiments. For example, the RF signal source 420 may produce a signal that oscillates in a range of about 10.0 megahertz (MHz) to about 100 MHz and/or from about 100 MHz to about 3.0 gigahertz (GHz).

In the embodiment of FIG. 4, the RF signal source 420 may include multiple amplifier stages, such as a driver amplifier stage and a final amplifier stage, to generate an amplified output signal. For example, the output signal of the RF signal source 420 may have a power level in a range of about 100 watts to about 400 watts or more.

The gain applied by the power amplifier may be controlled using gate bias voltages and/or drain supply voltages provided by the power supply and bias circuitry 426 to each amplifier stage. More specifically, power supply and bias circuitry 426 provides bias and supply voltages to each RF amplifier stage in accordance with control signals received from system controller 412.

In an embodiment, RF signal source 420 may include transistors of different designs not limited to any particular semiconductor technology. Such transistors may include GaN transistors, other types of MOSFETs, BJTs, or transistors utilizing another semiconductor technology.

Defrosting cavity 460 and any load 464 (e.g., food, liquids, and so on) positioned in the defrosting cavity 460 present a cumulative load for the electromagnetic energy (or RF power) that is radiated into the cavity 460 by the electrodes 440, 472. More specifically, the cavity 460 and the load 464 present an impedance to the system, referred to as a cavity input impedance. The cavity input impedance changes during a defrosting operation as the temperature of the load 464 increases.

Electrical power is supplied to the RF signal source 420 by the power supply and bias circuitry 426. Power supply and bias circuitry 426 generally outputs a DC voltage to the RF signal source 420, where the DC voltage may be in the range of 0 volts to 65 volts. The magnitude of the DC voltage outputted by power supply and bias circuitry 426 may be set or determined by system controller 412. For example, based upon inputs received from the user interface 480 and the sensors 490, system controller 412 may select an appropriate output voltage for power supply and bias circuitry 426. The output voltage may be greater, for example, for loads 464 having a greater weight than for loads that weigh less. Based upon those various inputs, the system controller 412 may utilize a look-up table to determine a suitable output voltage for power supply and bias circuitry 426. In some embodiments, the system controller 412 may cause the output voltage of power supply and bias circuitry 426 to vary throughout a defrosting process for a particular load 464.

To achieve the different output DC voltages of power supply and bias circuitry 426, the power supply and bias circuitry 426 may be configured to be a variable power supply capable of generating and outputting those different output voltages. But, in other embodiments, the power supply and bias circuitry 426 may be configured to generate a fixed output voltage. In that case, the defrosting system 400 may incorporate a pulse-width modulation circuit configured to modulate that fixed output voltage into variable output voltages (e.g., voltages ranging from 0 volts to 65 volts) that may be utilized to operate the RF signal source 420 and implement the functionality of the defrosting system 400.

Figure 5A:
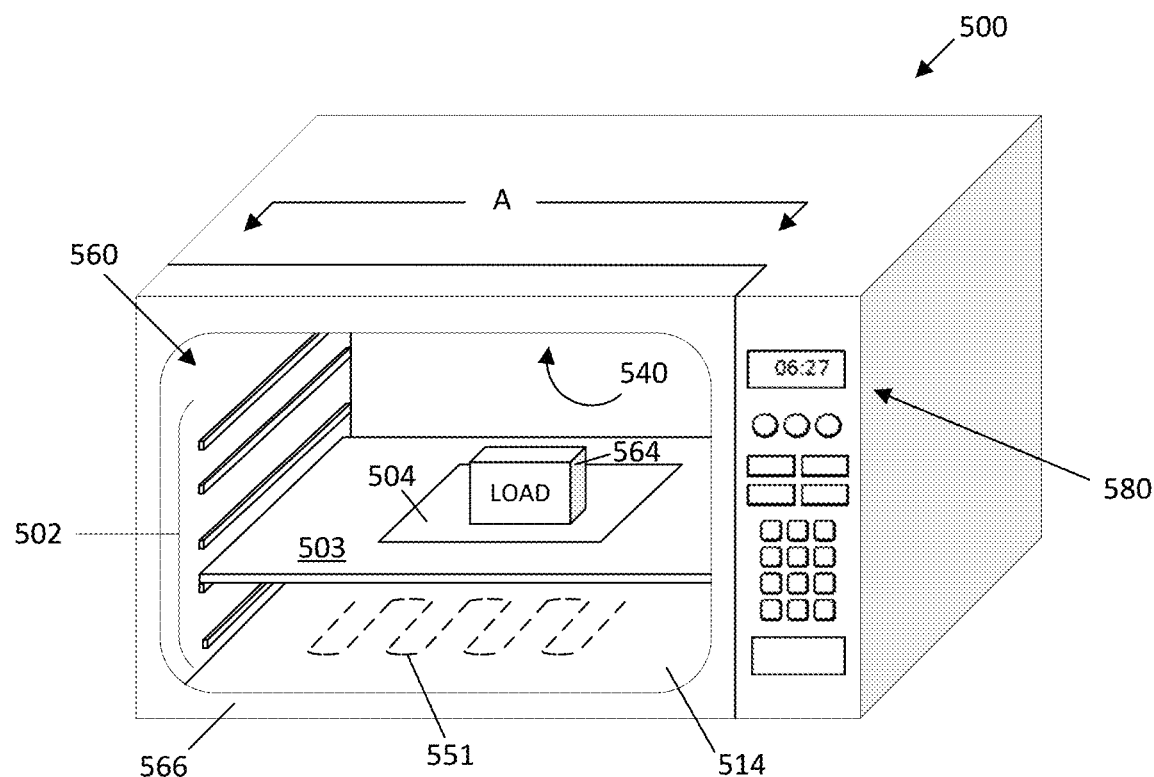
FIG. 5A is a perspective view of a defrosting appliance that may include support structures for supporting a repositionable electrode, in accordance with an example embodiment.

FIGS. 5A, 5B, 5C, 5D, 5E, and 5F, referred to collectively herein as FIG. 5, show various depictions of a defrosting system 500 that includes structures to enable a repositionable electrode to be disposed at various heights within a cavity 560 of the system 500. FIG. 5A shows an illustrative defrosting system 500, which may be operated to defrost or otherwise increase the temperature of a load 564. As shown, the defrosting system 500 may include control panel 580, a cavity 560 defined by a containment structure 566, support structures (sometimes referred to as repositionable shelf support structures) 502 (e.g., support structures 322, 422, FIGS. 3, 4), an upper electrode 540 (e.g., electrode 340, 440, FIGS. 3, 4) embedded in or otherwise disposed at a ceiling of the containment structure (i.e., a top interior surface of the cavity 560), and a repositionable shelf 503 that consists of or includes a repositionable electrode 504 (e.g., electrode 372, 472, FIGS. 3, 4). The repositionable shelf 503 may be a sheet of conductive material, or a combination of conductive and non-conductive materials. In an embodiment, the repositionable shelf 503 may be a non-conductive sheet that includes the repositionable electrode 504, which may be electrically conductive (e.g., metal). In another embodiment, the repositionable shelf 503 may be entirely conductive, with the repositionable electrode 504 being integrally formed with the repositionable shelf 503 (i.e., not distinct from the repositionable shelf 503 as shown in FIG. 5A). The support structures 502 may, for example, be rails, slots, or other applicable support structures disposed at side walls of the containment structure 566, the repositionable shelf 503 being supported by a pair of the support structures 502 when disposed in the cavity 560. In some embodiments, the support structures 502 may include conductive connectors which, when the repositionable shelf 504 is disposed on a pair of the support structures 502, electrically connect the electrode of the repositionable shelf 504 to a ground voltage or to an output of an RF signal source (e.g., RF signal source 320, 420, FIGS. 3, 4).

The defrosting system 500 may also serve, for example, secondary functions in addition to defrosting operations, such as the conventional operations of a microwave oven, a toaster oven, or a conventional oven. For example, for embodiments in which the defrosting system 500 is a toaster oven or conventional oven, secondary heating operations may be performed using a heating element 551, which may be disposed at a bottom, top, or side interior surface of the containment structure enclosing the cavity 560. For example, the heating element 551 may be embedded in or disposed over a lower region 514 of the containment structure 566, the upper surface of the lower region 514 defining a floor of the cavity 560. The heating element 551 may be coupled to a power source, and may be, for example, a resistive heating element. During secondary heating operations, electricity may be conducted through the heating element 551 to convert electrical energy to thermal energy via resistive heating. These secondary heating operations (e.g., resistive heating operations) may be performed separately from, or in combination with, defrosting operations performed by the defrosting system 500 according to instructions provided via the control panel 580, for example.

The control panel 580 may include an electronic display and one or more buttons that allow a user to interact with and view information regarding the defrosting system 500. The electronic display may, in some embodiments, be a touchscreen display. The control panel 580 may also enable a user to provide inputs to the defrosting system 500 regarding parameters for a defrosting operation (e.g., characteristics of the load to be defrosted, and so on), start and cancel buttons, mechanical controls (e.g., a door/drawer open latch), and so on. In addition, the user interface may be configured to provide user-perceptible outputs indicating the status of a defrosting operation (e.g., a countdown timer, visible indicia indicating progress or completion of the defrosting operation, and/or audible tones indicating completion of the defrosting operation) and other information.

The repositionable shelf 503 may be inserted into the cavity to rest on the support structures 502. For example, the repositionable shelf 503 may have a substantially planar top surface, which may have a length and width approximately equal to the interior length and width of the containment structure 566. For embodiments in which the electrode 504 is not electrically floating and the repositionable shelf 503 includes a non-conductive sheet and the conductive repositionable electrode 504, the non-conductive sheet may include one or more interior or surface conductive traces that electrically connect the repositionable electrode 504 to conductive surfaces of the support structures 502 (e.g., that are electrically connected to ground or to an RF signal source) when the repositionable shelf 503 is inserted into the cavity. When inserted in the cavity 560, the repositionable shelf 503 may effectively divide the cavity 560 into first and second (e.g., upper and lower) volumes.

Figure 6A:
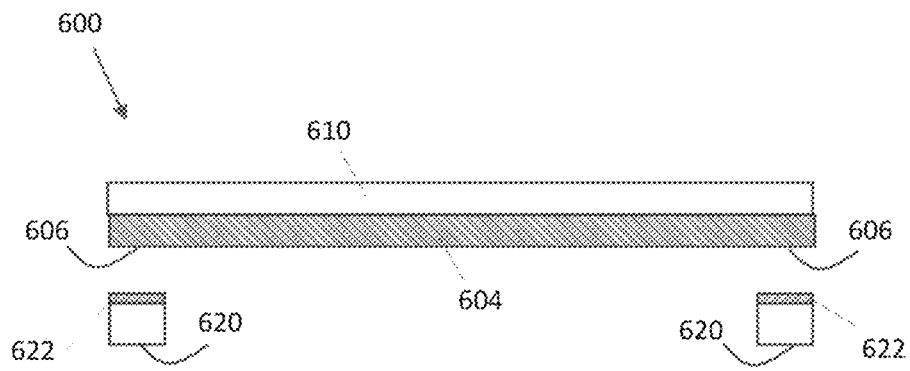
FIG. 6A is a cross-sectional side view of an embodiment of a repositionable shelf, in accordance with an example embodiment.

The repositionable electrode 504 may form all or a portion of the repositionable shelf 503. For example, FIG. 6A is a cross-sectional side view of an embodiment of a repositionable shelf 600 (e.g., repositionable shelf 503), in accordance with an example embodiment, in which a repositionable electrode 604 forms substantially all of the repositionable shelf 600. In the embodiment of FIG. 6A, a non-conductive material 610 is disposed on a top surface of the repositionable electrode 604 to isolate the load (e.g., load 564) from the repositionable electrode 604. In embodiments in which the electrode 604 either is grounded or connected to the RF signal source during operation, the electrode 604 includes electrically-conductive engagement surfaces 606 that are positioned in locations that will physically and electrically engage with corresponding conductive surfaces 622 of a set of support structures 620 (e.g., support structures 502) when the shelf 600 is slid onto or otherwise physically engaged with the support structures 620.

Figure 6B:
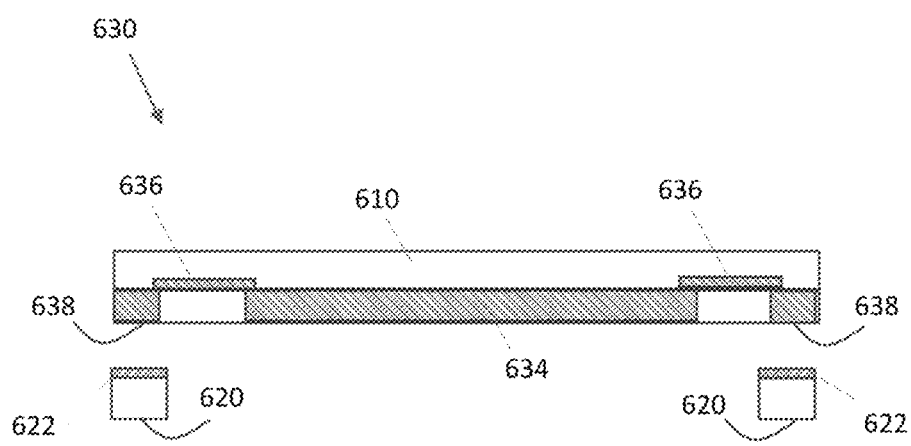
FIG. 6B is a cross-sectional side view of an embodiment of a repositionable shelf, in accordance with another example embodiment.

FIG. 6B is a cross-sectional side view of another embodiment of a repositionable shelf 630 that includes a repositionable electrode 634 coupled to or embedded within non-conductive support structures 640. Again, a non-conductive material 610 is disposed on a top surface of the repositionable electrode 634 to isolate the load (e.g., load 564) from the repositionable electrode 634. In addition, the repositionable shelf 630 includes additional electrically conductive structures 636 (e.g., wires, printed conductive traces, and so on) that electrically couple the electrically conductive engagement surfaces 638 of the shelf 630 with the electrode 634. Again, in embodiments in which the electrode 634 either is grounded or connected to the RF signal source during operation, the electrically-conductive engagement surfaces 638 are positioned in locations that will physically and electrically engage with corresponding conductive surfaces 622 of a set of support structures 620 (e.g., support structures 502) when the shelf 630 is slid onto or otherwise physically engaged with the support structures 620.

Referring back to FIG. 5A, in some embodiments, the upper surface of the repositionable electrode 504 (e.g., the surface over which the load 564 is shown to be disposed) may have a surface area that is at least as large as the surface area of the lower surface of the upper electrode 540 (e.g., the surface of the upper electrode 540 that faces the upper surface of the repositionable electrode 504). It should be noted that the repositionable shelf 503 and the repositionable electrode 504 may have different sizes. For example, the cavity 560 may have a height in the range of 27 cm to 33 cm, a length (i.e., depth) of 29 cm to 35 cm, and a width in a range of 30 cm to 36 cm. The lower surface of the upper electrode 540 (e.g., the surface of the upper electrode 540 that faces the upper surface of the repositionable electrode 504) may have a length that is at least 3 cm less than the length of the cavity 560 and a width that is at least 3 cm less than the width of the cavity 560 in order to provide sufficient clearance to prevent arcing between the walls of the containment structure 566 and the upper electrode 540. The upper surface of the repositionable electrode 504 may have a length that is less than or equal to the length of the cavity 560 and greater than or equal to the length of the upper electrode 540, and may have a width that is less than or equal to the width of the cavity 560 and greater than or equal to the width of the upper electrode 540. The thicknesses (e.g., heights) of both the upper electrode 540 and the repositionable electrode 504 may be between about 0.2 mm to 1 mm. By dimensioning the repositionable electrode 504 with respect to the upper electrode 540 and the cavity 560 in accordance with the above example, better electric field compression may be achieved between the electrodes 540 and 504 during defrosting operations. The above ranges are intended to be illustrative and not limiting, and dimensions of the cavity 560, the repositionable electrode 504, and the upper electrode 540 may be greater or less than these ranges in some embodiments In one illustrative, non-limiting example, the cavity 560 may define a volume having width, length, and height dimensions of 33 cm×32 cm×30 cm, the upper electrode 540 may have a circular lower surface with a radius of 8 cm, and the repositionable electrode 504 may have a rectangular upper surface with width and length dimensions of 31 cm×30 cm.

While in the present embodiment, the repositionable shelf 503 is shown to rest on a top surface of at least one of the support structures 502, it should be understood that other embodiments may be realized for supporting the repositionable shelf 503. For example, channels may be formed in the support structures 502, or sets of horizontal channels extending from the front (door side) of the cavity 560 toward the back of the cavity 560 may be formed at various heights in the side-walls of the containment structure 566 itself, and opposite edges of the repositionable shelf 503 may be slid into the channels. As another example, the repositionable shelf 503 and the support structures 502 may be formed to have complementary shapes, such that the repositionable shelf 503 may be secured, at least partially, against lateral movement when fully engaged with (e.g., slid over or set onto) the support structures 502. In still other embodiments, the repositionable shelf 503 may include brackets (not shown) or other structures that engage with corresponding bracket receptors (not shown) in one or more sidewalls of the cavity 560. As per previously-discussed embodiments, the repositionable electrode 504 within the shelf 503 may be electrically coupled to ground or to the RF signal source through the brackets and bracket receptors. As used herein, the term "repositionable shelf support structures" refers to any structure that is configured to support a repositionable shelf in a given position above the bottom interior surface of the cavity, including but not limited to rails, channels, brackets, and other support structures.

The support structures 502 may be disposed at interior side-walls (e.g., symmetrically disposed at opposing interior sidewalls) of the containment structure 566. For example, multiple sets of corresponding support structures 502 may be disposed at various heights on opposite interior sidewalls of the containment structure 566. In the embodiments of FIG. 5, five sets of corresponding support structures 502 are shown, with the two corresponding support structures 502 of each set being disposed at a same height above the bottom interior surface of the cavity 560. For example, the support structures 502 may be held in place at the side-walls of the containment structure 566 by screws, latches, channels, adhesives, or any other applicable means of affixing the support structures 502 to the side-walls of the containment structure 566. In an alternate embodiment, the support structures 502 may be integrally formed with the side-walls of the containment structure 566. In some embodiments in which the repositionable electrode 504 is electrically floating, the support structures 502 may be formed completely from dielectric material, which may electrically insulate the repositionable electrode 504.

In other embodiments (as described previously in conjunction with FIGS. 6A and 6B) in which the repositionable electrode 504 is electrically coupled to ground or to an RF signal source during operation (e.g., when the repositionable shelf 503 is fully engaged with a set of the support structures 502), the support structures 502 may be completely or partially electrically conductive and may have conductive surfaces (e.g., surfaces 622, FIGS. 6A, 6B) that are configured to physically and electrically connect to corresponding conductive surfaces (e.g., surfaces 606, 638) of the repositionable shelf 503. The conductive surfaces (e.g., surfaces 622) of the support structures 502 are, in turn, electrically connected to another component of the defrosting system 500, such as a ground terminal, the containment structure, or the RF signal source. It should be understood that the repositionable electrode 504 will generally be supported by two of support structures 502 (e.g., a pair of support rails) located on opposite sides (e.g., opposing surfaces) of the containment structure 566 and being located at substantially equal heights within the cavity 560.

It should further be understood that the repositionable shelf 503 may be removable and that the distance between the repositionable electrode 504 and the upper electrode 540 (e.g., and therefore the size of the upper and lower volumes, and the distance between the load 564 and the upper electrode 540) may be adjusted by placing the repositionable shelf 503 on support structures located at different heights within the cavity 560. For example, for a first load with a given height, the repositionable shelf 503 may be placed on a pair of first and second rails to define first and second volumes, with the first load being disposed in the first volume, and the first volume having a first height substantially corresponding to the given height of the first load. For a second load with a given height, the repositionable shelf 503 may be placed on a different pair of third and fourth rails to define third and fourth volumes, with the second load being disposed in the third volume, and the third volume having a second height corresponding to the given height of the second load. By minimizing the distance between the load 564 and the upper electrode 540, the amount of RF energy absorbed by the load 564 will increase, which may result in better system efficiency.

Figure 5B:
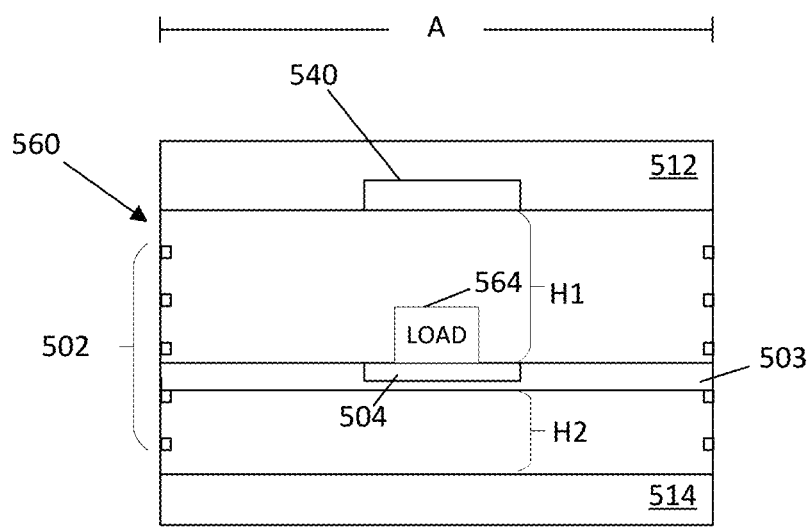
FIG. 5B is a front-view along slice 'A' of the defrosting appliance of FIG. 5A, in accordance with an example embodiment.
Figure 5C:
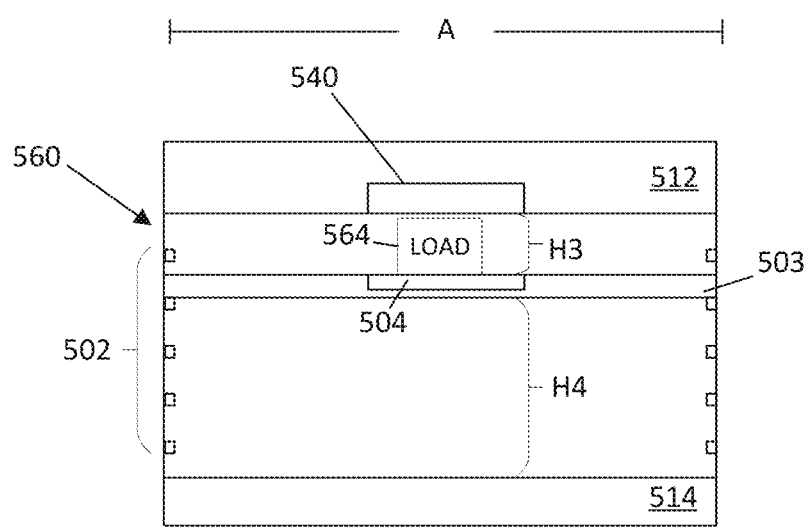
FIG. 5C is a front-view along slice 'A' of the defrosting appliance of FIG. 5A depicting an illustrative alternate placement of the repositionable electrode, in accordance with an example embodiment.

FIGS. 5B-5C show two illustrative embodiments of a front-facing view of the defrosting system 500 along cross-section A in order to depict the movable nature of the repositionable shelf 503 and repositionable electrode 504 and to depict the changes in distance between the repositionable electrode 504 and the upper electrode 540. In these embodiments, the upper electrode 540 is located in an upper region 512 of the defrosting system 500. In some embodiments, the upper region 512 may be at least partially filled with dielectric material, such as plastic, and the upper electrode 540 may be embedded in this dielectric material. In some embodiments, the lower region 514 may be at least partially filled with dielectric material, such as plastic. One or both of the upper electrode 540 and the electrode 540 may be electrically connected to an RF signal source 520 (e.g., RF signal source 320, 420, FIGS. 3, 4,) from which the electrodes 504, 540 may receive one or more RF signals.

In FIG. 5B the repositionable electrode 504 may be placed in the cavity 560 so as to have a distance H1 between the upper electrode 540 and the top of the repositionable electrode 504, and to have a distance H2 between the upper surface of the lower region 514 and the bottom surface of the repositionable electrode 504. As shown, this leaves a moderate amount of empty space between the top surface of the load 564 and the upper electrode 540, which may result in inefficiencies of the defrosting operation. FIG. 5C shows an alternate configuration, in which the repositionable electrode 504 is placed in the cavity 560 so as to have a distance H3 between the upper electrode 540 and the top of the repositionable electrode 504, and to have a distance H4 between the upper surface of the lower region 514 and the bottom surface of the repositionable electrode 504. It should be noted that H1 is greater than H3, while H4 is greater than H2, such that the repositionable electrode 504 is located closer to the upper electrode 540 in the configuration of FIG. 5C, compared to that of FIG. 5B. By moving the repositionable electrode 504 closer to the upper electrode 540, and thus by reducing the distance between the top surface of the load 564 and the upper electrode 540, the RF energy applied by the defrosting system 500 during defrosting operations becomes more concentrated between the repositionable electrode 504 and the upper electrode 540, thereby improving the efficiency (e.g., in terms of power efficiency and defrosting speed efficiency) of defrosting operations performed. Further, it should be understood that both of the embodiments of FIGS. 5B and 5C enable more efficient defrosting operations compared to if the load 564 was merely placed on the floor of the containment structure 566 without the presence of the repositionable electrode 504 to concentrate the RF energy (e.g., with the embodiment of FIG. 5C resulting in about a 20% increase in efficiency). As indicated previously, in various embodiments, the repositionable electrode 504 may be electrically floating, grounded or coupled to an RF signal source 520 (e.g., RF signal source 320, 420, FIGS. 3, 4) through its contact with the support structures 502. The latter embodiments will now be described in more detail in connection with FIGS. 5D-5F.

Figure 5D:
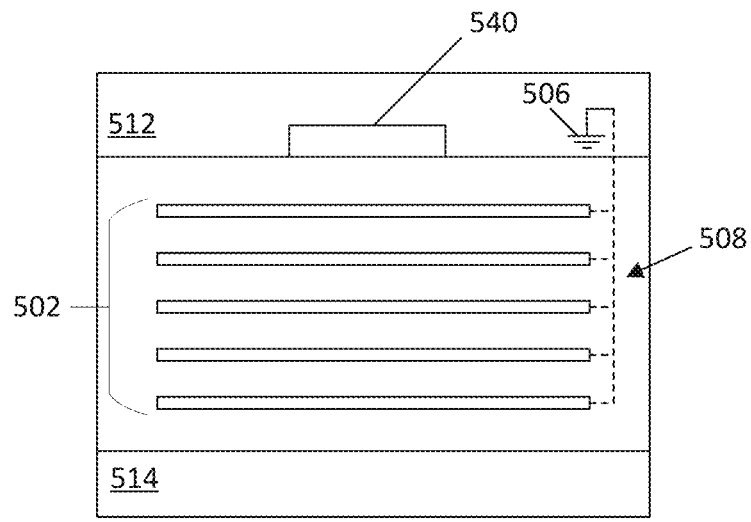
FIG. 5D is an interior side-view of the defrosting appliance of FIG. 5A, depicting support structures electrically coupled to an internal ground terminal of the defrosting appliance and disposed on an interior wall of the defrosting appliance, in accordance with an example embodiment.

FIG. 5D shows an interior, cross-sectional side-view of the defrosting system 500 in an embodiment in which the support structures 502 are partially or completely electrically conductive. In the present example, each of the support structures 502 (e.g., surfaces 622) may be coupled to an internal ground or common voltage terminal 506 via electrically conductive paths 508. As shown, the terminal 506 is located in region 512, but it should be understood that in other embodiments, the terminal 506 may instead be located at other locations within the defrosting system 500, such as the lower region 514. Here, the electrode 504, when placed in electrical contact with the support structures 502, may become electrically grounded, or held at a common voltage potential.

Figure 5E:
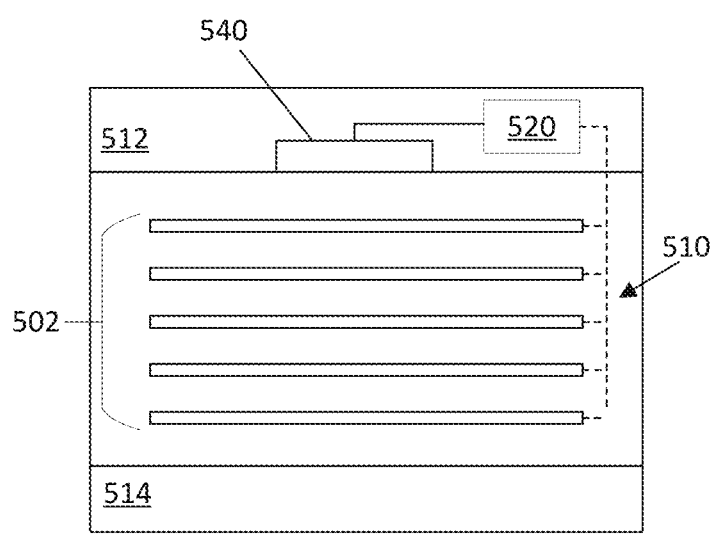
FIG. 5E is an interior side-view of the defrosting appliance of FIG. 5A, depicting support structures electrically coupled to an RF signal generator and disposed on an interior wall of the defrosting appliance, in accordance with an example embodiment.

FIG. 5E shows an interior, cross-sectional side-view of the defrosting system 500 in another embodiment in which the support structures 502 are partially or completely electrically conductive. In the present example, the support structures 502 (e.g., surfaces 622) may be coupled to an RF signal generator 520 (e.g., RF signal generator 320, 420, FIGS. 3, 4) via electrically conductive paths 510. Here, the electrode 504, when placed in electrical contact with the support structures 502, may act as the second electrode (e.g., electrode 372, 472, FIGS. 3, 4) of a balanced RF defrosting system (e.g., defrosting system 400, FIG. 4).

Figure 5F:
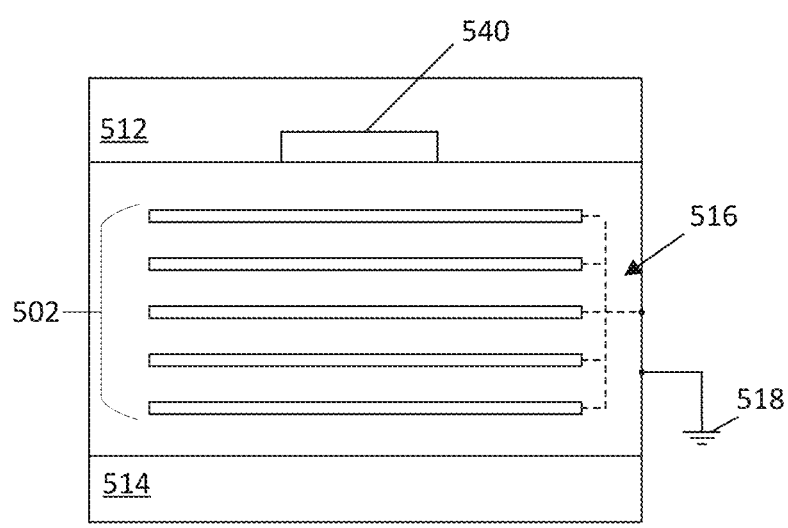
FIG. 5F is an interior side-view of the defrosting appliance of FIG. 5A, depicting support structures electrically coupled to an electrically grounded cavity of the defrosting appliance and disposed on an interior wall of the defrosting appliance, in accordance with an example embodiment.

FIG. 5F shows an interior, cross-sectional side-view of the defrosting system 500 in another embodiment in which the support structures 502 are partially or completely electrically conductive. In the present example, the support structures 502 (e.g., surfaces 622) may be electrically coupled to a conductive containment structure via electrically conductive paths 516. The containment structure 566 may be electrically conductive and may define at least a portion of the cavity 560, and may be coupled to a ground or common voltage terminal 518. Here, the electrode 504, when placed in electrical contact with the support structures 502, may become electrically grounded, or held at a common voltage potential.

Figure 7:
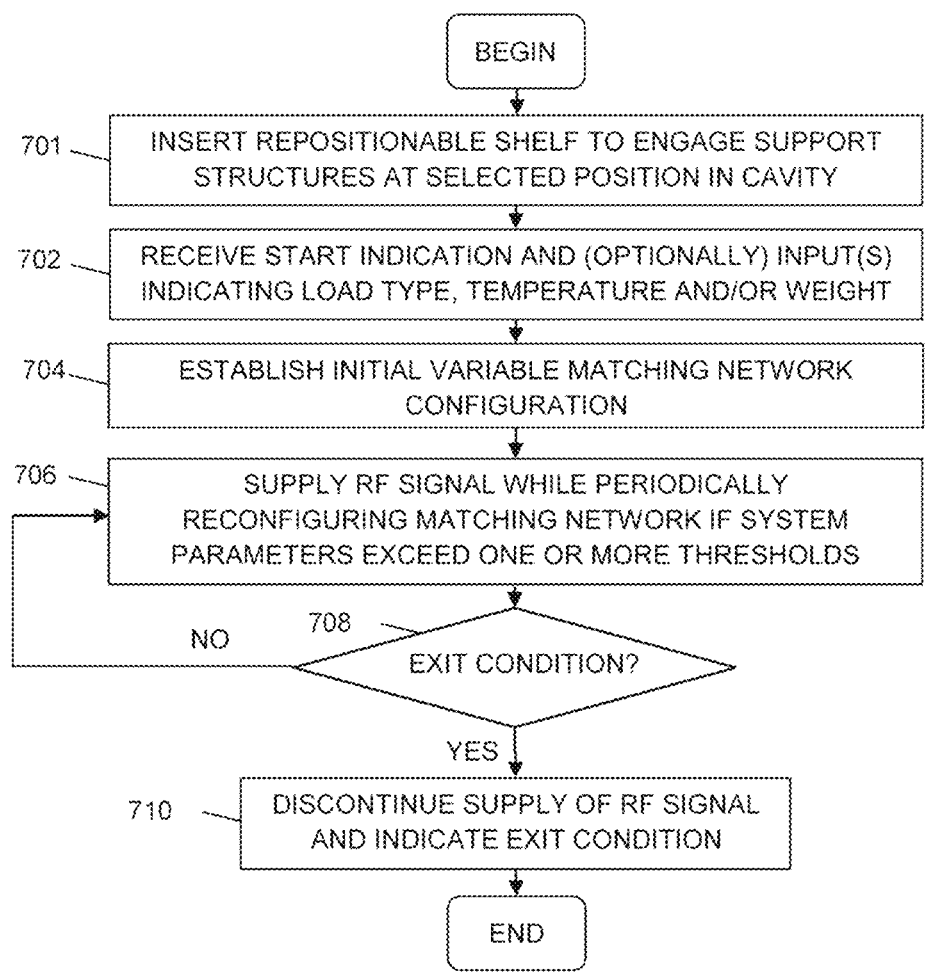
FIG. 7 is a flowchart of a method of operating a defrosting system, in accordance with an example embodiment.

Now that embodiments of the electrical and physical aspects of defrosting systems have been described, various embodiments of methods for operating such defrosting systems will now be described in conjunction with FIG. 7. More specifically, FIG. 7 is a flowchart of a method of operating a defrosting system (e.g., system 100, 210, 220, 300, 400, 500, FIGS. 1-5) with a repositionable electrode, in accordance with an example embodiment.

The method may begin, in block 701, when a repositionable shelf (e.g., repositionable shelf 124, 324, 424, 503, FIGS. 1, 3, 4, 5) is inserted into the system's defrosting cavity(e.g., cavity 360, 460, 560, FIGS. 3-5) at a selected position to engage with support structures (e.g., support structures 122, 322, 422, 502, FIGS. 1, 3, 4, 5) disposed at side walls of a containment structure (e.g., containment structure 366, 466, 566, FIGS. 3, 4, 5) of the system. For example, the repositionable shelf may be inserted into slots or onto rails that are attached to or integrally formed with the side walls of the containment structure. For example, a user may insert the repositionable shelf at a selected position in the containment structure, such that the amount of empty space above the repositionable shelf is minimized, while still leaving enough space for a load of a given size to be placed on the repositionable shelf In some embodiments, when the repositionable shelf is fully inserted into the containment structure, the repositionable shelf is placed in electrical contact with conductive portions of one or more of the support structures, where an electrode (e.g., electrode 172, 372, 472, 504, FIGS. 1, 3, 4, 5) included in the repositionable shelf is electrically grounded or is connected to an RF signal source (e.g., RF signal source 320, 420, 520, FIGS. 3, 4, 5) through the electrical contact with the support structures. In alternate embodiments the electrode of the repositionable shelf may be electrically floating, and non-conductive material included in the repositionable shelf and/or the support structures may electrically insulate the electrode from being electrically grounded or connected to the RF signal source.

At block 702, the system controller (e.g., system controller 312, 412, FIGS. 3, 4) receives an indication that a defrosting operation should start. Such an indication may be received, for example, after a user has place a load (e.g., load 364, 464, 564, FIGS. 3-5) into the system's defrosting cavity, has sealed the cavity (e.g., by closing a door or drawer), and has pressed a start button (e.g., of the user interface 380, 480, 580, FIGS. 3-5). In an embodiment, sealing of the cavity may engage one or more safety interlock mechanisms, which when engaged, indicate that RF power supplied to the cavity will not substantially leak into the environment outside of the cavity. As will be described later, disengagement of a safety interlock mechanism may cause the system controller immediately to pause or terminate the defrosting operation.

According to various embodiments, the system controller optionally may receive additional inputs indicating the load type (e.g., meats, liquids, or other materials), the initial load temperature, and/or the load weight. For example, information regarding the load type may be received from the user through interaction with the user interface (e.g., by the user selecting from a list of recognized load types). Alternatively, the system may be configured to scan a barcode visible on the exterior of the load, or to receive an electronic signal from an RFID device on or embedded within the load. Information regarding the initial load temperature may be received, for example, from one or more temperature sensors and/or IR sensors (e.g., sensors 390, 490, FIGS. 3, 4) of the system. Information regarding the load weight may be received from the user through interaction with the user interface, or from a weight sensor (e.g., sensor 390, 490, FIGS. 3, 4) of the system. As indicated above, receipt of inputs indicating the load type, initial load temperature, and/or load weight is optional, and the system alternatively may not receive some or all of these inputs.

In block 704, the system controller provides control signals to the variable matching network (e.g., network 370, 470, FIGS. 3, 4) to establish an initial configuration or state for the variable matching network. The control signals affect the values of various component values (e.g., inductances, resistances, and/or capacitances) within the variable matching network. For example, the control signals may affect the states of bypass switches, which are responsive to the control signals from the system controller.

A first portion of the variable matching network may be configured to provide a match for the RF signal source (e.g., RF signal source 320, 420, FIGS. 3, 4), and a second portion of the variable matching network may be configured to provide a match for the cavity (e.g., cavity 360, 460, FIGS. 3, 4) plus the load (e.g., load 364, 464, FIGS. 3, 4).

Once the initial variable matching network configuration is established, the system controller may, at block 706 perform a process of adjusting, if necessary, the configuration of the variable impedance matching network to find an acceptable or best match based on actual measurements that are indicative of the quality of the match. According to an embodiment, this process includes causing the RF signal source to supply a relatively low power RF signal through the variable impedance matching network to the electrode(s) (e.g., electrodes 340, 372 or 440, 472, FIGS. 3, 4). The system controller may control the RF signal power level through control signals to the power supply and bias circuitry (e.g., circuitry 326, 426, FIGS. 3, 4), where the control signals cause the power supply and bias circuitry to provide supply and bias voltages to an input of the RF signal source that are consistent with the desired signal power level. For example, the relatively low power RF signal may be a signal having a power level in a range of about 10 W to about 20 W, although different power levels alternatively may be used. A relatively low power level signal during the match adjustment process is desirable to reduce the risk of damaging the cavity or load (e.g., if the initial match causes high reflected power), and to reduce the risk of damaging the switching components of the variable inductance networks (e.g., due to arcing across the switch contacts).

Power detection circuitry of the defrosting system then measures the reflected and (in some embodiments) forward power along the transmission path (e.g., path 328, 428, FIGS. 3, 4) between the RF signal source and the electrode(s), and provides those measurements to the system controller. The system controller may then determine a ratio between the reflected and forward signal powers, and may determine the S11 parameter for the system based on the ratio. The system controller may store the received power measurements (e.g., the received reflected power measurements, the received forward power measurement, or both), and/or the calculated ratios, and/or S11 parameters for future evaluation or comparison, in an embodiment.

The system controller may periodically determine, based on the reflected power measurements, and/or the reflected-to-forward signal power ratio, and/or the S11 parameter, whether or not the match provided by the variable impedance matching network is acceptable (e.g., the reflected power is below a threshold, or the ratio is 10 percent or less, or the measurements or values compare favorably with some other criteria). Alternatively, the system controller may be configured to determine whether the match is the "best" match. A "best" match may be determined, for example, by iteratively measuring the reflected RF power (and in some embodiments the forward reflected RF power) for all possible impedance matching network configurations (or at least for a defined subset of impedance matching network configurations), and determining which configuration results in the lowest reflected RF power and/or the lowest reflected-to-forward power ratio.

When the system controller determines that the match is not acceptable or is not the best match, the system controller may adjust the match by reconfiguring the variable impedance matching network. For example, this may be achieved by sending control signals to the variable impedance matching network, which cause the network to increase and/or decrease the variable component values (e.g., variable capacitances, resistances, and/or inductances) within the network. This reconfiguration of the variable impedance matching network may be repeated until a "best" match is determined.

Once an acceptable or best match is determined, the defrosting operation may commence via the supply of the RF signal by the RF signal source. For example, commencement of the defrosting operation may include increasing the power of the RF signal supplied by the RF signal source to a relatively high power RF signal. Once again, the system controller may control the RF signal power level through control signals to the power supply and bias circuitry, where the control signals cause the power supply and bias circuitry to provide supply and bias voltages to an input of the RF signal source that are consistent with the desired signal power level. For example, the relatively high power RF signal may be a signal having a power level in a range of about 50 W to about 500 W, although different power levels alternatively may be used.

The power detection circuitry may then periodically measure the reflected power and, in some embodiments, the forward power along the transmission path (e.g., path 328, 428, FIGS. 3, 4) between the RF signal source and the electrode(s), and may provide those measurements to the system controller. The system controller again may determine a ratio between the reflected and forward signal powers, and may determine the S11 parameter for the system based on the ratio. The system controller may store the received power measurements, and/or the calculated ratios, and/or S11 parameters for future evaluation or comparison, in an embodiment. According to an embodiment, the periodic measurements of the forward and reflected power may be taken at a fairly high frequency (e.g., on the order of milliseconds) or at a fairly low frequency (e.g., on the order of seconds). For example, a fairly low frequency for taking the periodic measurements may be a rate of one measurement every 10 seconds to 20 seconds.

The system controller may determine, based on one or more reflected signal power measurements, one or more calculated reflected-to-forward signal power ratios, and/or one or more calculated S11 parameters, whether or not the match provided by the variable impedance matching network is acceptable. For example, the system controller may use a single reflected signal power measurement, a single calculated reflected-to-forward signal power ratio, or a single calculated S11 parameter in making this determination, or may take an average (or other calculation) of a number of previously-received reflected signal power measurements, previously-calculated reflected-to-forward power ratios, or previously-calculated S11 parameters in making this determination. To determine whether or not the match is acceptable, the system controller may compare the received reflected signal power, the calculated ratio, and/or S11 parameter to one or more corresponding thresholds, for example. For example, in one embodiment, the system controller may compare the received reflected signal power to a threshold of, for example, 5 percent (or some other value) of the forward signal power. A reflected signal power below 5 percent of the forward signal power may indicate that the match remains acceptable, and a ratio above 5 percent may indicate that the match is no longer acceptable. In another embodiment, the system controller may compare the calculated reflected-to-forward signal power ratio to a threshold of 10 percent (or some other value). A ratio below 10 percent may indicate that the match remains acceptable, and a ratio above 10 percent may indicate that the match is no longer acceptable. When the measured reflected power, or the calculated ratio or S11 parameter is greater than the corresponding threshold (i.e., the comparison is unfavorable), indicating an unacceptable match, then the system controller may initiate re-configuration of the variable impedance matching network.

When the system controller determines, based on one or more reflected power measurements, one or more calculated reflected-to-forward signal power ratios, and/or one or more calculated S11 parameters, that the match provided by the variable impedance matching network is still acceptable (e.g., the reflected power measurements, calculated ratio, or S11 parameter is less than a corresponding threshold, or the comparison is favorable), the system may evaluate whether or not an exit condition has occurred, in block 708. In actuality, determination of whether an exit condition has occurred may be an interrupt driven process that may occur at any point during the defrosting process. However, for the purposes of including it in the flowchart of FIG. 6, the process is shown to occur after block 706.

In any event, several conditions may warrant cessation of the defrosting operation. For example, the system may determine that an exit condition has occurred when a safety interlock is breached. Alternatively, the system may determine that an exit condition has occurred upon expiration of a timer that was set by the user (e.g., through user interface 380, 480, FIGS. 3, 4) or upon expiration of a timer that was established by the system controller based on the system controller's estimate of how long the defrosting operation should be performed. In still another alternate embodiment, the system may otherwise detect completion of the defrosting operation.

If an exit condition has not occurred, then the defrosting operation may continue by returning to block 706. When an exit condition has occurred, then in block 710, the system controller causes the supply of the RF signal by the RF signal source to be discontinued. For example, the system controller may disable the RF signal source (e.g., RF signal source 320, 420, FIGS. 3, 4) and/or may cause the power supply and bias circuitry to discontinue provision of the supply current. In addition, the system controller may send signals to the user interface that cause the user interface to produce a user-perceptible indicia of the exit condition (e.g., by displaying "door open" or "done" on a display device, or providing an audible tone). The method may then end.

It should be understood that the order of operations associated with the blocks depicted in FIG. 6 corresponds to an example embodiment, and should not be construed to limit the sequence of operations only to the illustrated order. Instead, some operations may be performed in different orders, and/or some operations may be performed in parallel.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in an embodiment of the depicted subject matter.

An embodiment of a thermal increase system coupled to a containment structure for containing a load includes a plurality of shelf support structures disposed within a cavity of the thermal increase system. The plurality of shelf support structures is configured to support a repositionable electrode at a plurality of positions within the cavity. The system includes a first electrode disposed at a first surface of the containment structure, wherein the repositionable electrode is disposed within the containment structure so as to divide the cavity into separate volumes. The system includes a radio frequency signal source electrically connected to one or both of the first electrode and the repositionable electrode. The radio frequency signal source is configured to provide radio frequency energy to either or both of the first electrode and the repositionable electrode.

In another embodiment, a system includes a containment structure forming a cavity, a first electrode disposed in the cavity, and a plurality of support structures disposed in the cavity at multiple heights. The system includes a second electrode disposed in the cavity. The second electrode is removable and is configured to divide the cavity into first and second volumes when supported by a first support structure of the plurality of support structures, and is configured to divide the cavity into third and fourth volumes when supported by a second support structure of the plurality of support structures. The system includes a radio frequency signal source that supplies radio frequency energy to either or both the first electrode or the second electrode.

In another embodiment, a thermal increase system includes a containment structure that forms a cavity, an electrode disposed at an upper interior surface of the containment structure, a repositionable electrode disposed across the cavity so as to divide the cavity into first and second volumes, and a first support structure disposed at a first sidewall of the containment structure. The system includes a second support structure disposed at a second sidewall of the containment structure that opposes the first sidewall. The repositionable electrode is removably engaged with the first and second support structures. The system includes a radio frequency signal source electrically connected to either or both of the electrode, or the repositionable electrode. The radio frequency signal source is configured to provide radio frequency energy to either or both the electrode or the repositionable electrode.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A thermal increase system coupled to a containment structure for containing a load, the thermal increase system comprising:
a plurality of shelf support structures disposed within a cavity of the thermal increase system, wherein the plurality of shelf support structures is configured to support a repositionable electrode at a plurality of positions within the cavity, wherein the plurality of shelf support structures includes a plurality rails disposed on second and third surfaces of the containment structure, wherein the second surface opposes the third surface, and wherein the repositionable electrode is supported by a first rail disposed on the second surface and a second rail disposed on the third surface;

a first electrode disposed at a first surface of the containment structure;

the repositionable electrode disposed within the containment structure so as to divide the cavity into separate volumes; and a radio frequency signal source electrically connected to one or both of the first electrode and the repositionable electrode, the radio frequency signal source being configured to provide radio frequency energy to either or both of the first electrode and the repositionable electrode.

2. The thermal increase system of claim 1, wherein the repositionable electrode is removable, and the repositionable electrode is configured to define first and second volumes when supported by the first and second rails, and is configured to define third and fourth volumes when supported by third and fourth rails of the plurality of rails, wherein the third volume is different from the first volume.

3. The thermal increase system of claim 1, wherein the repositionable electrode is at least partially metal, wherein the repositionable electrode comprises an upper surface having a first surface area that is at least as large as a second surface area of the first electrode, and wherein the upper surface of the repositionable electrode opposes the lower surface of the first electrode.

4. The thermal increase system of claim 1, wherein the repositionable electrode is electrically grounded through the plurality of shelf support structures.

5. The thermal increase system of claim 1, further comprising:
a repositionable shelf that comprises the repositionable electrode, wherein at least a portion of the repositionable shelf is non-conductive, the repositionable electrode is electrically floating, and the repositionable shelf is supported by a pair of shelf support structures of the plurality of shelf support structures.

6. The thermal increase system of claim 1, further comprising:
a variable impedance matching network connected between the radio frequency signal source and either or both of the first electrode and the repositionable electrode and having a variable impedance, wherein the variable impedance matching network is configured to adjust the variable impedance based on one or more parameters of the radio frequency signal source.

7. A system, comprising:
a containment structure forming a cavity;
a first electrode disposed in the cavity;
a plurality of support structures disposed in the cavity at multiple heights; and
a second electrode disposed in the cavity, the second electrode being removable and being configured to divide the cavity into first and second volumes when supported by a first support structure of the plurality of support structures, and being configured to divide the cavity into third and fourth volumes when supported by a second support structure of the plurality of support structures; and
a radio frequency signal source that supplies radio frequency energy to either or both the first electrode or the second electrode.

8. The system of claim 7, wherein the second electrode is a conductive plate, wherein the second electrode comprises an upper surface having a first surface area that is at least as large as a second surface area of a lower surface the first electrode, and wherein the upper surface of the second electrode opposes the lower surface of the first electrode.

9. The system of claim 8, wherein the radio frequency signal source supplies a balanced radio frequency signal to the first electrode and the second electrode, each of the plurality of support structures is at least partially conductive, and the second electrode is coupled to the radio frequency signal source through at least one of the plurality of support structures.

10. The system of claim 8, wherein each of the plurality of support structures is at least partially conductive, and the second electrode is electrically grounded through at least one of the plurality of support structures.

11. The system of claim 8, wherein the support structures are selected from a plurality of rails, a plurality of channels, a plurality of brackets, and a plurality of bracket receptors.

12. The system of claim 8, further comprising:
a repositionable shelf that comprises the second electrode and non-conductive material that electrically insulates the second electrode from the plurality of support structures.

13. The system of claim 7, further comprising:
a variable impedance matching network connected between the radio frequency signal source and either or both of the first electrode and the second electrode and having a variable impedance, wherein the variable impedance matching network is configured to adjust the variable impedance based on one or more parameters of the radio frequency signal source.

14. A thermal increase system comprising:
a containment structure that forms a cavity;
an electrode disposed at an upper interior surface of the containment structure;
a repositionable electrode disposed across the cavity so as to divide the cavity into first and second volumes;
a first support structure disposed at a first sidewall of the containment structure;
a second support structure disposed at a second sidewall of the containment structure that opposes the first sidewall, the repositionable electrode being removably engaged with the first and second support structures; and
a radio frequency signal source electrically connected to either or both of the electrode, or the repositionable electrode, the radio frequency signal source being configured to provide radio frequency energy to either or both the electrode or the repositionable electrode.

15. The thermal increase system of claim 14, wherein the repositionable electrode is electrically floating and the first and second support structures each comprise dielectric material.

16. The thermal increase system of claim 14, wherein at least one of the first and second support structures is at least partially conductive, and the repositionable electrode is electrically grounded through at least one of the first and second support structures.

17. The thermal increase system of claim 14, wherein at least one of the first and second support structures is at least partially conductive, and the repositionable electrode is electrically connected to the radio frequency signal source through at least one of the first and second support structures.

18. The thermal increase system of claim 14, wherein the first support structure includes at least one a rail, a channel, a bracket, and a bracket receptor.

19. The thermal increase system of claim 14, further comprising:
a variable impedance matching network connected between the radio frequency signal source and either or both of the electrode and the repositionable electrode and having a variable impedance, wherein the variable impedance matching network is configured to adjust the variable impedance based on one or more parameters of the radio frequency signal source.

\* \* \* \* \*